(12) United States Patent
Milstein et al.

(10) Patent No.: US 8,504,605 B2
(45) Date of Patent: Aug. 6, 2013

(54) PROXIMITY FILTERING OF MULTIPARTY VOIP COMMUNICATIONS

(75) Inventors: David Milstein, Redmond, WA (US); Linda Criddle, Kirkland, WA (US); Scott C Forbes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1252 days.

(21) Appl. No.: 11/443,555

(22) Filed: May 30, 2006

(65) Prior Publication Data

US 2007/0282989 A1  Dec. 6, 2007

(51) Int. Cl.
G06F 15/173 (2006.01)
H04M 3/42 (2006.01)

(52) U.S. Cl.
USPC .......................... 709/200; 709/205; 709/224

(58) Field of Classification Search
USPC ................. 709/223, 224, 205, 218; 704/200, 704/238, 227
See application file for complete search history.

(56) References Cited

U.S. PATENT DOCUMENTS

| | | | |
|---|---|---|---|
| 6,559,863 B1 * | 5/2003 | Megiddo | 715/753 |
| 6,735,175 B1 * | 5/2004 | Havens | 370/236 |
| 6,910,078 B1 * | 6/2005 | Raman et al. | 709/231 |
| 7,346,654 B1 * | 3/2008 | Weiss | 709/204 |
| 7,379,962 B1 * | 5/2008 | Matsuoka | 709/203 |
| 2002/0141560 A1 | 10/2002 | Khayatan et al. | 379/219 |
| 2002/0161882 A1 * | 10/2002 | Chatani | 709/224 |
| 2003/0017836 A1 | 1/2003 | Vishwanathan et al. | 455/517 |
| 2003/0112947 A1 * | 6/2003 | Cohen | 379/202.01 |
| 2004/0109023 A1 * | 6/2004 | Tsuchiya | 345/758 |
| 2005/0041793 A1 | 2/2005 | Fulton et al. | 379/211.01 |
| 2005/0239486 A1 | 10/2005 | D'Avello et al. | 455/519 |
| 2006/0025216 A1 * | 2/2006 | Smith | 463/35 |
| 2006/0067500 A1 * | 3/2006 | Christofferson et al. | 379/202.01 |
| 2006/0153357 A1 * | 7/2006 | Acharya et al. | 379/266.01 |
| 2007/0280210 A1 | 12/2007 | Milstein et al. | 370/356 |

FOREIGN PATENT DOCUMENTS

EP  0843168 A2 * 11/1997

OTHER PUBLICATIONS

Office Action mailed Aug. 20, 2010, issued in U.S. Appl. No. 11/443,590.
Office Action mailed Jan. 28, 20011, issued in U.S. Appl. No. 11/443,590.
Amendment/Response to Office Action filed Nov. 19, 2010 in U.S. Appl. No. 11/443,590.
Amendment/Response to Office Action filed May 31, 2011 in U.S. Appl. No. 11/443,590.

* cited by examiner

*Primary Examiner* — Thai Nguyen
(74) *Attorney, Agent, or Firm* — Merchant & Gould

(57) ABSTRACT

A method for adjusting sound data that is transmitted between a first client and a second client is disclosed. The sound data may adjusted or an adjustment indicator that indicates how to adjust the sound data may accompany the sound data. The method comprises determining a proximity between the clients; adjusting the sound data based on the determined proximity; and transmitting the adjusted sound data. The determined proximity may be the physical proximity between the clients or a virtual proximity between virtual representations of the clients. Rules for adjusting sound data based on proximity indicate how to adjust sound characteristics, such as, but not limited to volume and frequency. The rules may also take into account environmental factors such as atmospheric and aquatic environmental factors.

18 Claims, 24 Drawing Sheets

PROXIMITY FILTERING OF MULTIPARTY VOIP COMMUNICATIONS

BACKGROUND

Generally described, an Internet telephony system provides an opportunity for users to have a call connection with enhanced calling features, compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not provide a systematic way to adjust sound characteristics, such as volume and frequency, according to the proximity of conversation participants.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and a computer-readable medium containing computer-executable instructions for adjusting sound characteristics described in sound data that is transmitted between a first client and a second client is disclosed. Sound characteristics include, but are not limited to, volume and frequency. The sound data may be adjusted or an adjustment indicator that indicates how to adjust the sound data may accompany the sound data.

The method comprises determining a proximity between the first client and the second client; adjusting the sound data based on the determined proximity; and transmitting the adjusted sound data. The determined proximity may be the physical proximity between the first client and the second client or a virtual proximity between virtual representations of the clients.

The method further comprises selecting sound characteristics that are adjusted based on proximity and selecting rules for adjusting sound characteristics based on proximity. Sound characteristics may be selected by the first client, the second client, or both clients. Rules for adjusting sound characteristics based on proximity indicate how to adjust sound characteristics, such as, but not limited to volume and frequency. The rules may also include taking into account environmental factors such as, but not limited to, atmospheric and aquatic environmental factors.

A system implementing the method for adjusting sound data transmitted between clients is also disclosed. The system may be implemented by a server, by the clients, or by both the server and clients.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

An exemplary proximity service provides a way to adjust sound characteristics according to the proximity of clients, e.g., the proximity of a sender and a receiver. An exemplary method used by proximity services transmits sound data from a sender to a receiver; determines the proximity (e.g., virtual, physical, etc.) of the sender and the receiver; and adjusts the sound characteristics described by the transmitted sound data according to the proximity of the receiver and the sender.

Proximity services are often supported by methods or systems for collecting contextual information relating to a conversation over a communication channel. More specifically, proximity services are often supported by methods or systems that provide and implement structured hierarchies used for communicating the collected contextual information. Although such systems and methods will be described with relation to illustrative structural hierarchies and an IP telephony environment, one skilled in the relevant art will appreciate that the disclosed methods are exemplary and should not be construed as limiting.

Figure 1:
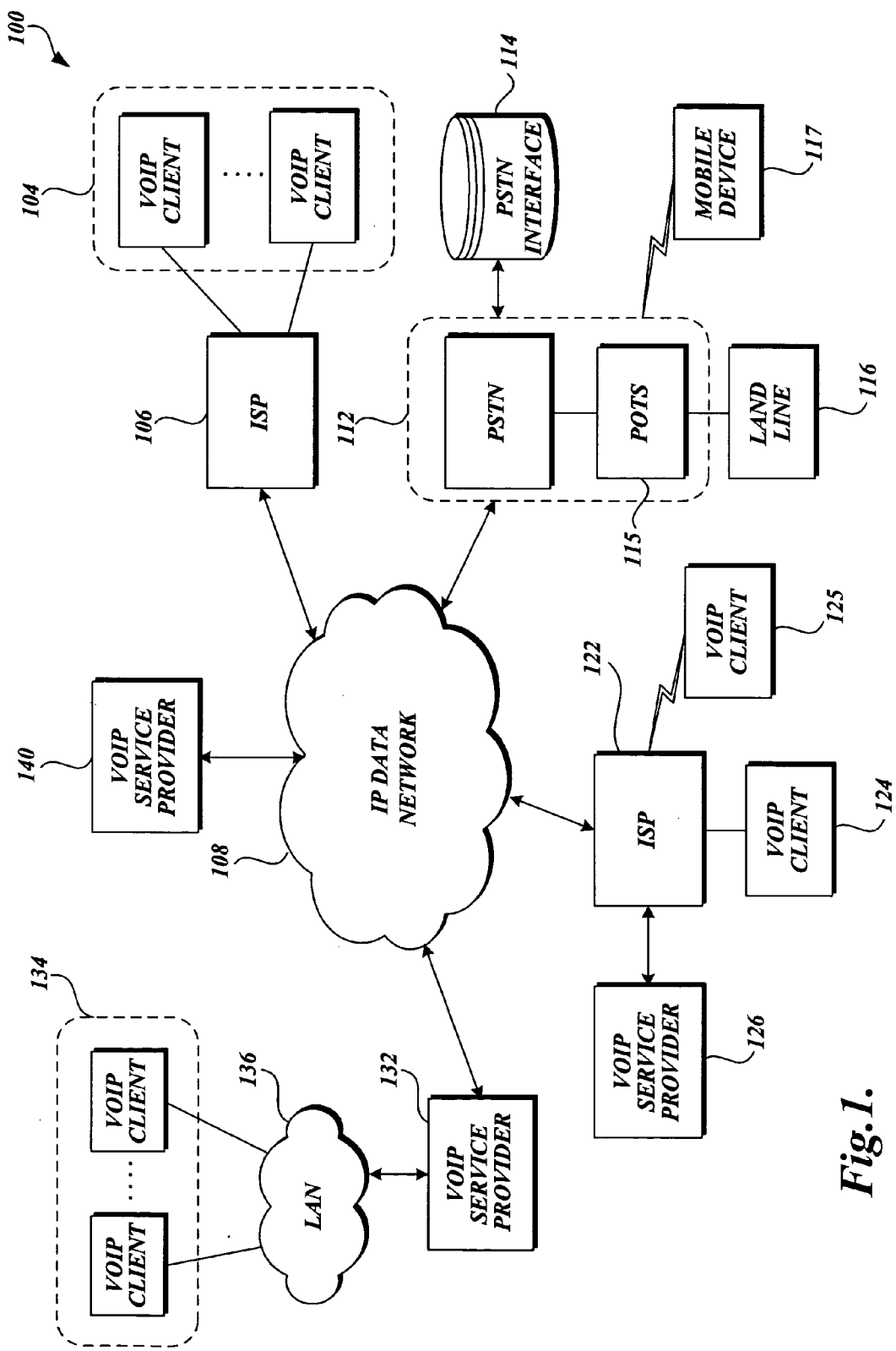
FIG. 1 is a block diagram of a VoIP environment for establishing a conversation channel between various clients.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices, and a unique VoIP client identifier. For example, a single individual, five associated VoIP devices, and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of proximity information (e.g., provider proximity list) for individuals communicating in a call conversation. The VoIP service providers 126, 132, 140 may determined and assign an appropriate proximity to data packets based on proximity information provided by VoIP clients 104, 124, 125, 136 in conjunction with the provider proximity list.

VoIP service providers 132 may be coupled to a private network, such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

One or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114, such as a PSTN gateway, may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116, may request a connection with the VoIP client based on the unique VoIP identifier of that client and the appropriate VoIP device associated with the VoIP client will be used to establish a connection. In one example, an individual associated with the VoIP client may specify which devices are to be used in connecting a call based on a variety of conditions (e.g., connection based on the calling party, the time of day, etc.).

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
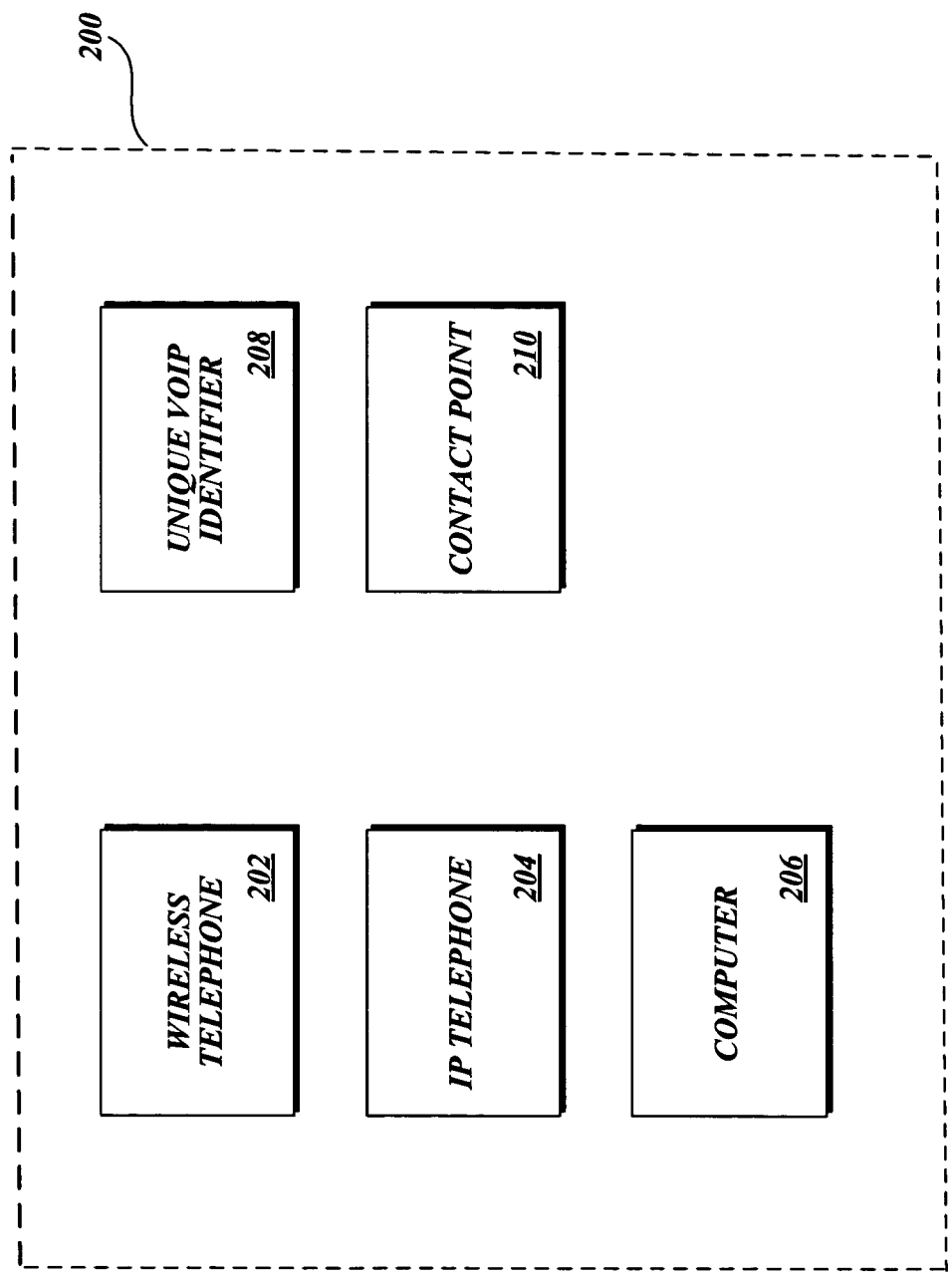
FIG. 2 is a block diagram of a VoIP client.

Referring now to FIG. 2, a block diagram illustrating an exemplary VoIP client 200 that includes several VoIP devices and a unique VoIP identifier is shown. Each VoIP device 202, 204, 206 may include a storage that is used to maintain voice messages, address books, client specified rules, proximity information related to incoming calls, etc. Alternatively, or in addition thereto, a separate storage, maintained for example by a service provider, may be associated with the VoIP client and accessible by each VoIP device that contains information relating to the VoIP client. A suitable VoIP device such as a wireless phone 202, an IP phone 204, or a computer 206 with proper VoIP applications may be part of the VoIP client 200. The VoIP client 200 also maintains one or more unique VoIP identifier 208. The unique VoIP identifier(s) 208 may be constant or change over time. For example, the unique identifier (s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. It is also possible that the VoIP client 200 may maintain multiple VoIP identifiers. In this alternative way, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. Each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
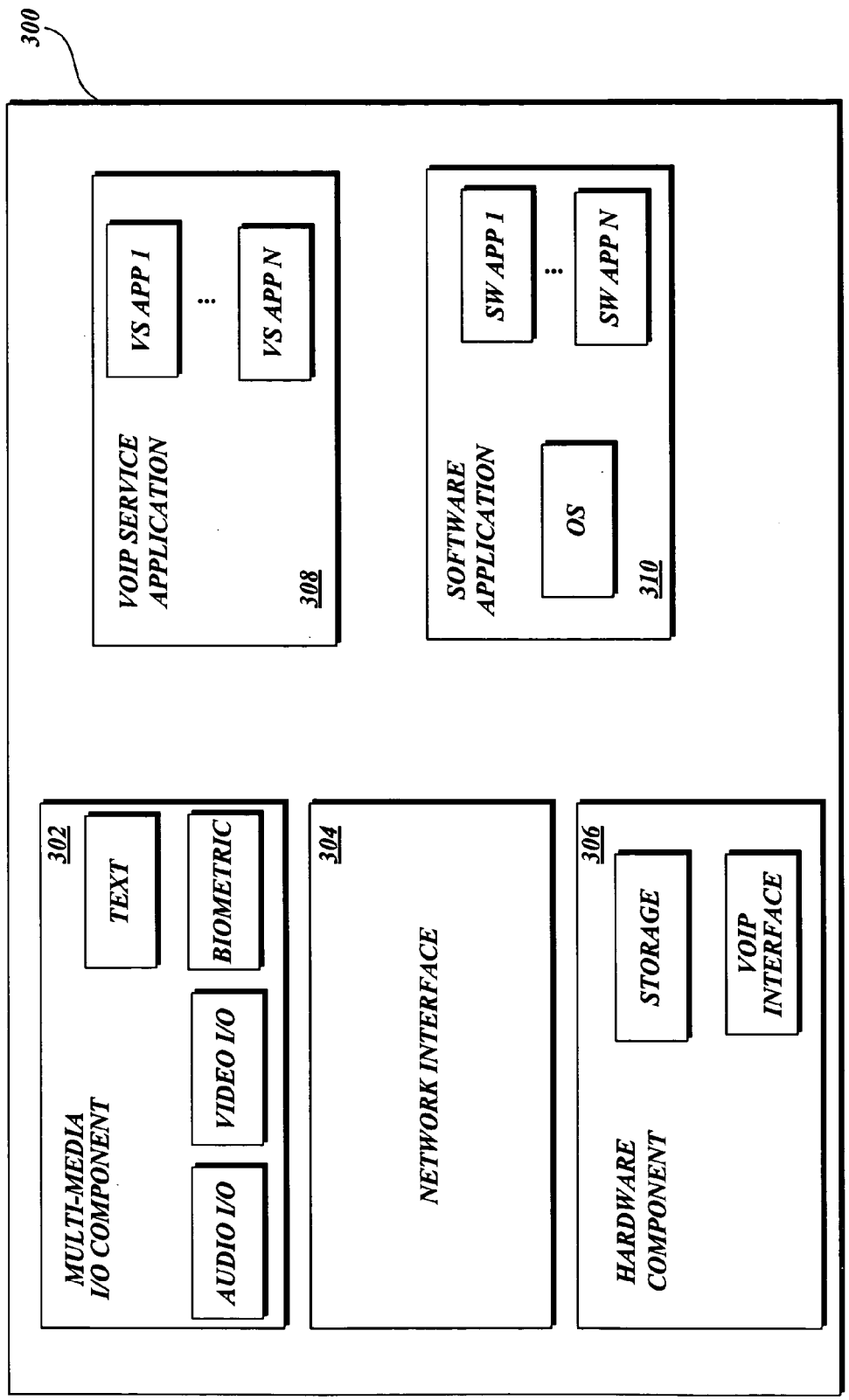
FIG. 3 is a block diagram of various components associated with a VoIP client.

FIG. 3 is a block diagram of a VoIP client 300 that may be associated with one or more VoIP clients. It is to be noted that the VoIP client 300 is described as an example. It will be appreciated that any suitable device with various other components can be used. For using VoIP services, the VoIP client 300 may include components suitable for receiving, transmitting and processing various types of data packets. For example, the VoIP client 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP client 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc) associated with the VoIP client in which the device is included. The hardware component 306 may include a VoIP interface card which allows non-VoIP client device to transmit and receive a VoIP conversation.

The VoIP client 300 may further include a software application component 310 for the operation of the VoIP client 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
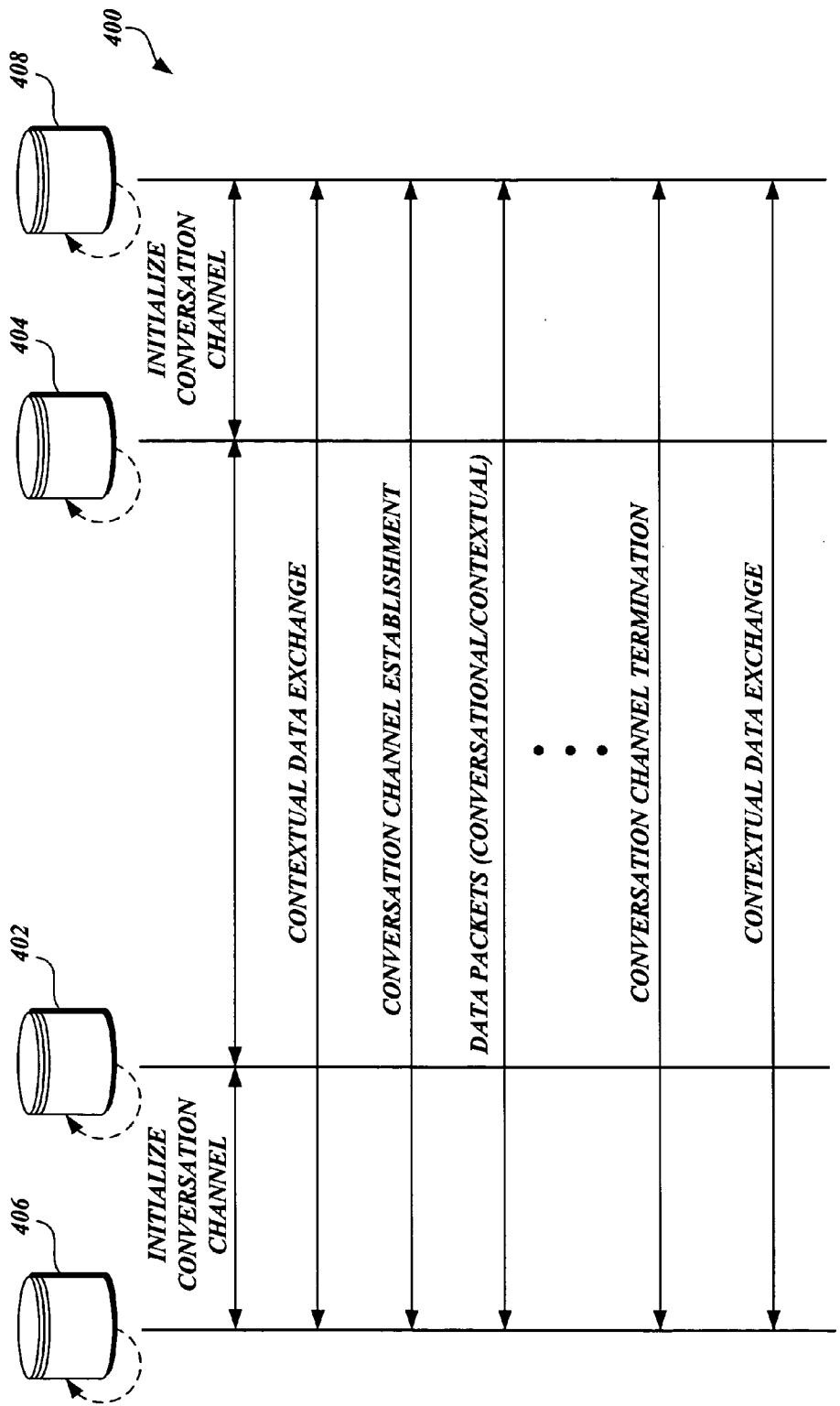
FIGS. 4A and 4B are block diagrams illustrative of the exchange of data between two VoIP clients over a conversation channel.

With reference to FIG. 4A, a block diagram illustrative of a conversation flow 400 between VoIP devices of two different VoIP clients over a conversation channel is shown. During a connection set-up phase, a VoIP device of a first VoIP client 406 requests to initiate a conversation channel with a second VoIP client 408. Alternatively, a VoIP service provider 402 (Provider 1) for the first VoIP client 406 receives the request to initiate a conversation channel and forwards the request to a VoIP service provider 404 (Provider 2) for the second VoIP client 406. While this example uses two VoIP service providers and two VoIP clients, any number and combination of VoIP clients and/or service providers may be used. For example, only one service provider may be used in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There is a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will use the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

For example, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. The exchanged contextual information may include information relating to the calling VoIP client 406, the device, and the VoIP client 408 being called. For example, the contextual information sent from the called VoIP client 406 may include proximity list of incoming calls from various potential calling VoIP clients including VoIP client 406.

Available media types, rules of the calling client and the client being called, proximity information of the calling client, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information. The VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
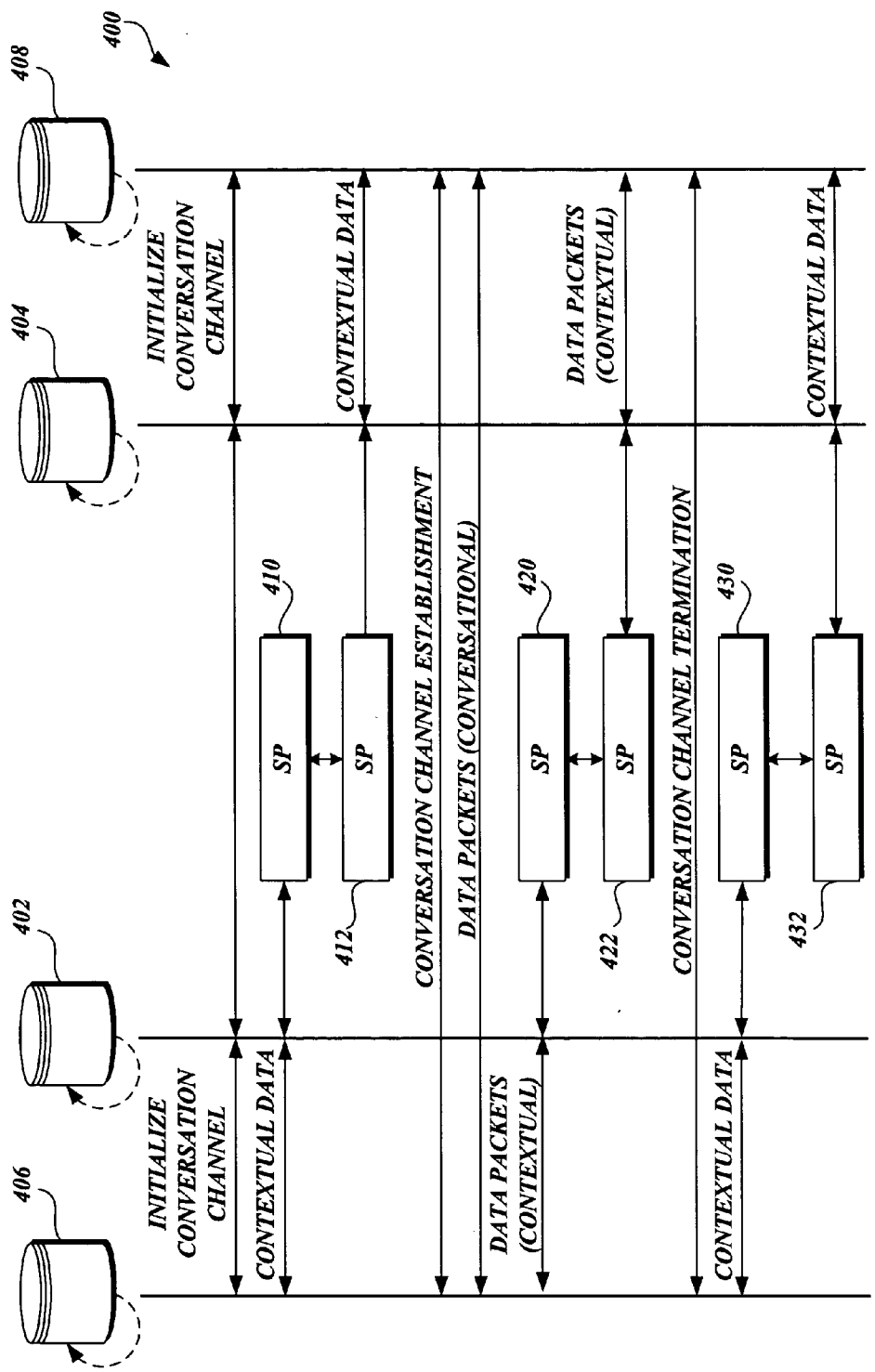

FIG. 4B is a block diagram illustrative of a conversation flow 400 between devices of two VoIP clients via several service providers. As with FIG. 4A, the example described herein will use the scenario in which each client only has one device associated therewith and the connection occurs between those two devices. During a connection set-up phase, a device of a first VoIP client 406 requests to initiate a conversation channel for communication with a second VoIP client 408. For example, a VoIP service provider 402 (Provider 1) for the first VoIP client 406 receives the request to initiate a conversation channel and forwards the request to a VoIP service provider 404 (Provider 2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. Provider 1 402 may identify particular contextual information that Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider 1 and Provider 2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. A Provider 1 402, Provider 2 404, or a third party SP 410, 412 may add, modify and/or delete contextual information before forwarding the contextual information to the next VoIP device (s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. Contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
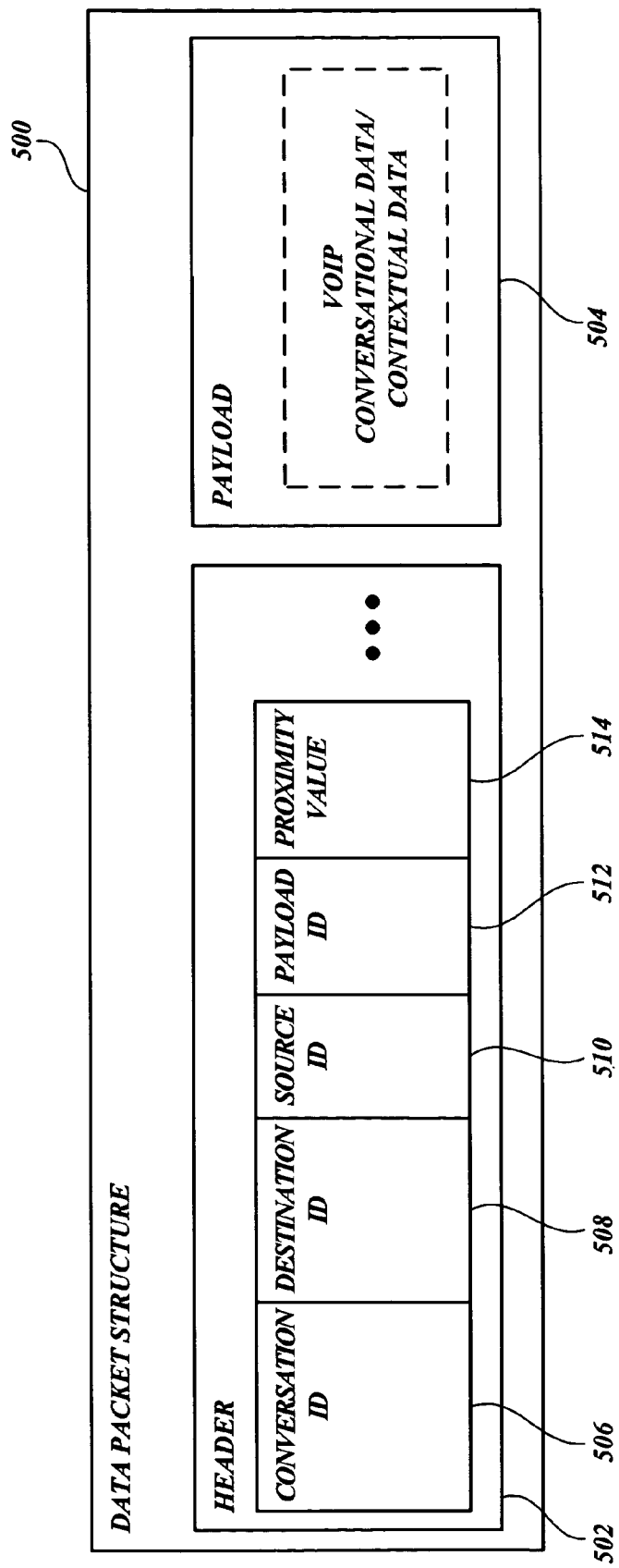
FIG. 5 is a block diagram of a data packet used over a communication channel established in the VoIP environment of FIG. 1.

FIG. 5 is a block diagram of a data packet structure 500 used over a communication (conversation) channel. The data packet structure 500 may be a data packet structure for an IP data packet suitable for being used to carry conversation data (e.g., voice, multimedia data, and the like) or contextual data (e.g., information relating to the VoIP services, and the like). However, any other suitable data structure can be used to carry conversation data or contextual data. The data packet structure 500 includes a header 502 and a payload 504. The header 502 may contain information necessary to deliver the corresponding data packet to a destination. Additionally, the header 502 may include information used in the process of a conversation. Such information may include conversation ID 506 for identifying a conversation (e.g., call), a destination ID 508, such as a unique VoIP identifier of the client being called, a source ID 510 (unique VoIP identifier of the calling client or device identifier), payload ID 512 for identifying type of payload (e.g., conversation or contextual), proximity value 514 for identifying the distance between the sender and receiver or the location of the sender, individual ID (not shown) for identifying the individual for which the conversation data is related, and the like. Alternatively, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

A structured hierarchy may be predefined for communicating contextual information over a VoIP conversation channel. The contextual information may include any information relating to VoIP clients, VoIP devices, conversation channel connections (e.g., call basics), conversation context (e.g., call context) and the like. More specifically, the contextual information may include client preference, client rules, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
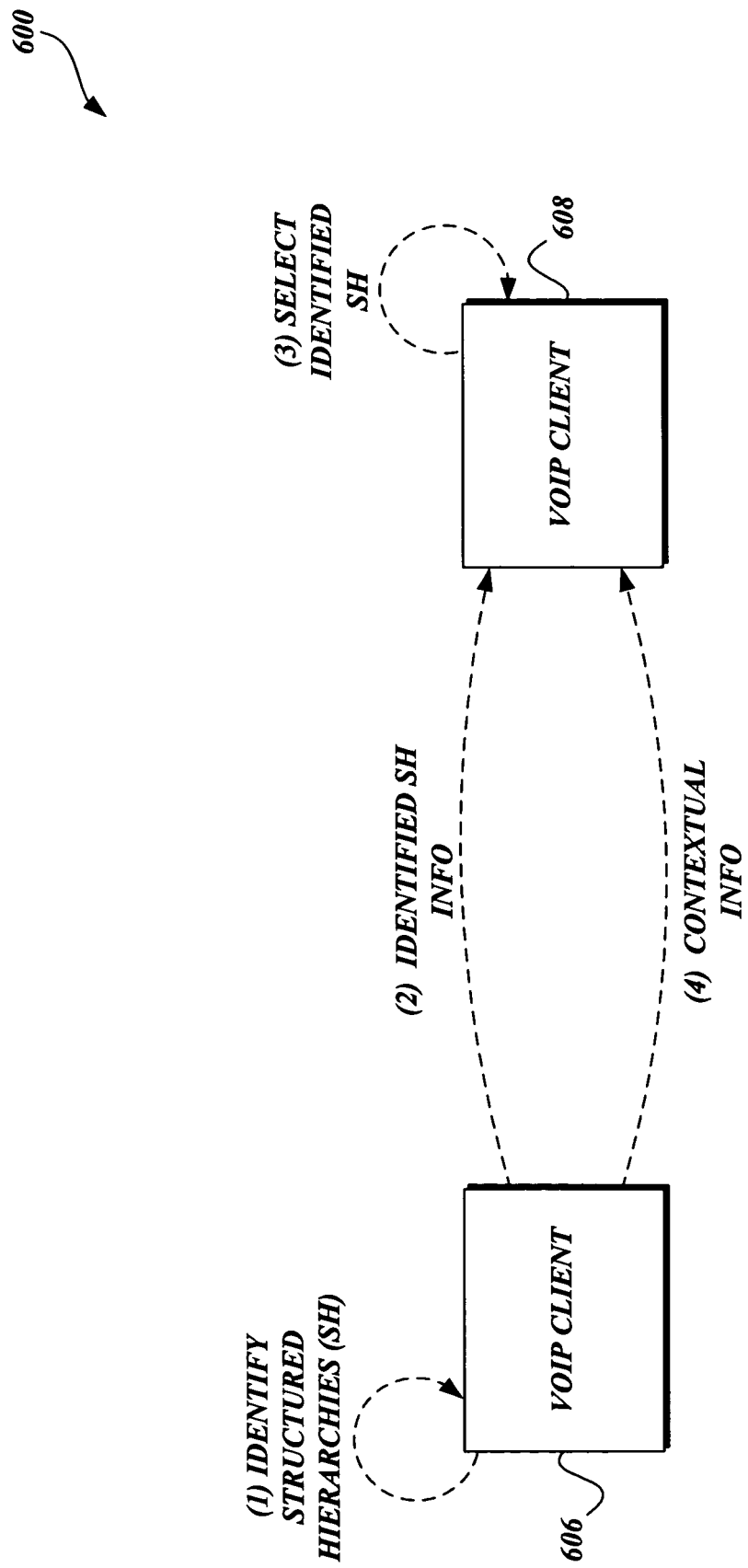
FIG. 6 is a block diagram illustrating interactions between two VoIP clients for transferring contextual information defined by identified structured hierarchies.

With reference to FIG. 6, a block diagram 600 illustrating interactions between two VoIP clients for transferring contextual information is shown. As with FIGS. 4A and 4B, the example described herein will use the scenario in which each client only has one device associated therewith and the connection occurs between those two devices. Devices of VoIP client 606 and VoIP client 608 have established a VoIP conversation channel. It may be identified which structured hierarchies will be used to carry certain contextual information by VoIP client 606. The information regarding the identified structured hierarchies may include information about which structured hierarchies are used to carry the contextual information, how to identify the structured hierarchy, and the like. Such information will be exchanged between VoIP client 606 and VoIP client 608 before the corresponding contextual information is exchanged. Upon receipt of the information about which structured hierarchy is used to carry the contextual information, VoIP client 608 looks up predefined structured hierarchies (e.g., XML namespace and the like) to select the identified structured hierarchies. The predefined structured hierarchies can be globally stored and managed in a centralized location accessible from a group of VoIP clients. A Uniform Resource Identifier (URI) address of the centralized location may be transmitted from VoIP client 606 to VoIP client 608.

Each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP client 608 is expecting to receive a data stream such that data packets corresponding to the data stream are defined according to the identified structured hierarchies. VoIP client 606 can begin sending contextual information represented in accordance with the identified structured hierarchies. The VoIP client 608 starts a data binding process with respect to the contextual information. For example, instances of the identified structured hierarchies may be constructed with the received contextual information.

Figure 7:
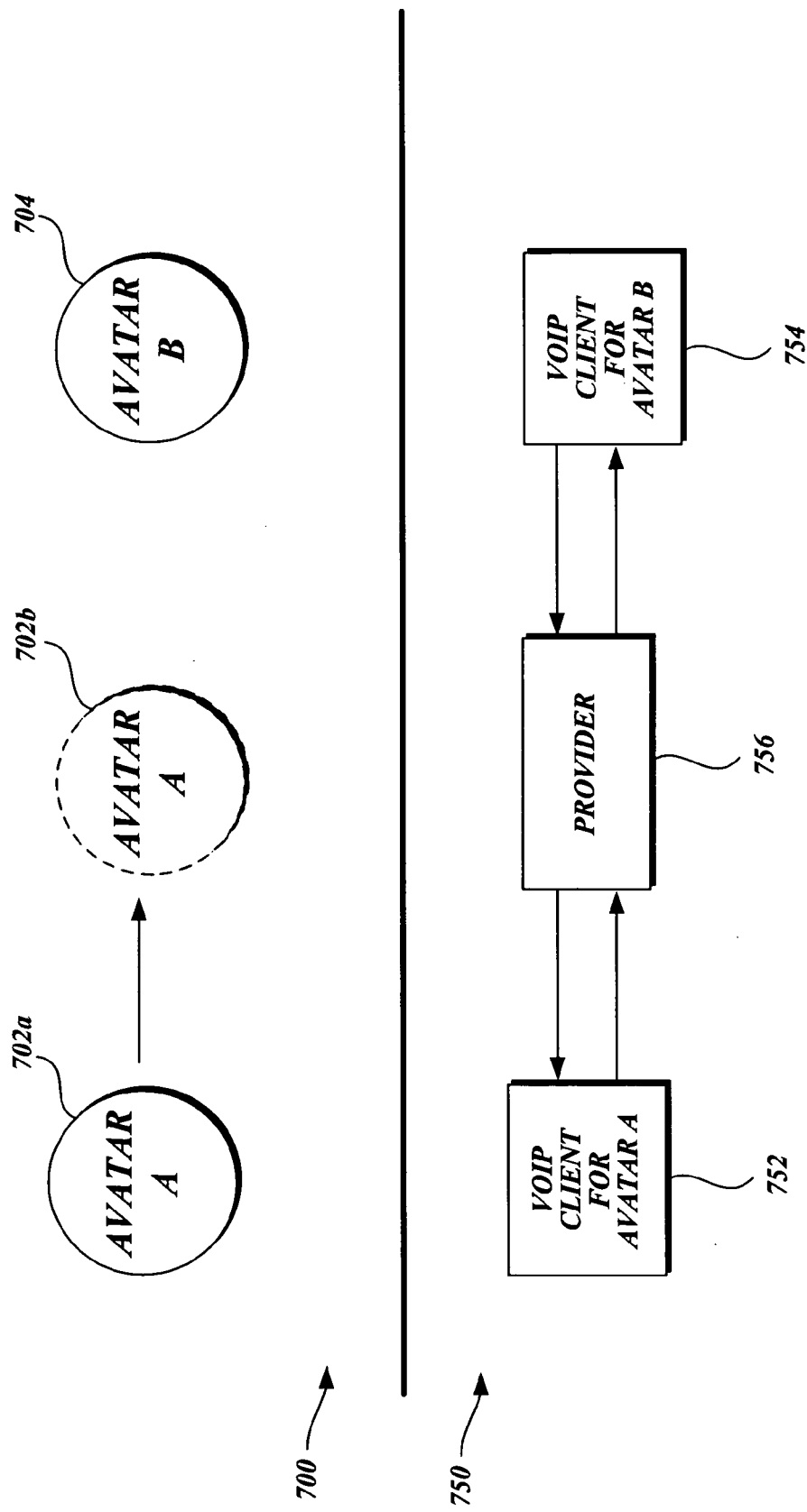
FIG. 7 is a block diagram illustrating the relationship between a group of clients supported by a proximity service and the clients' avatars.
Figure 8:
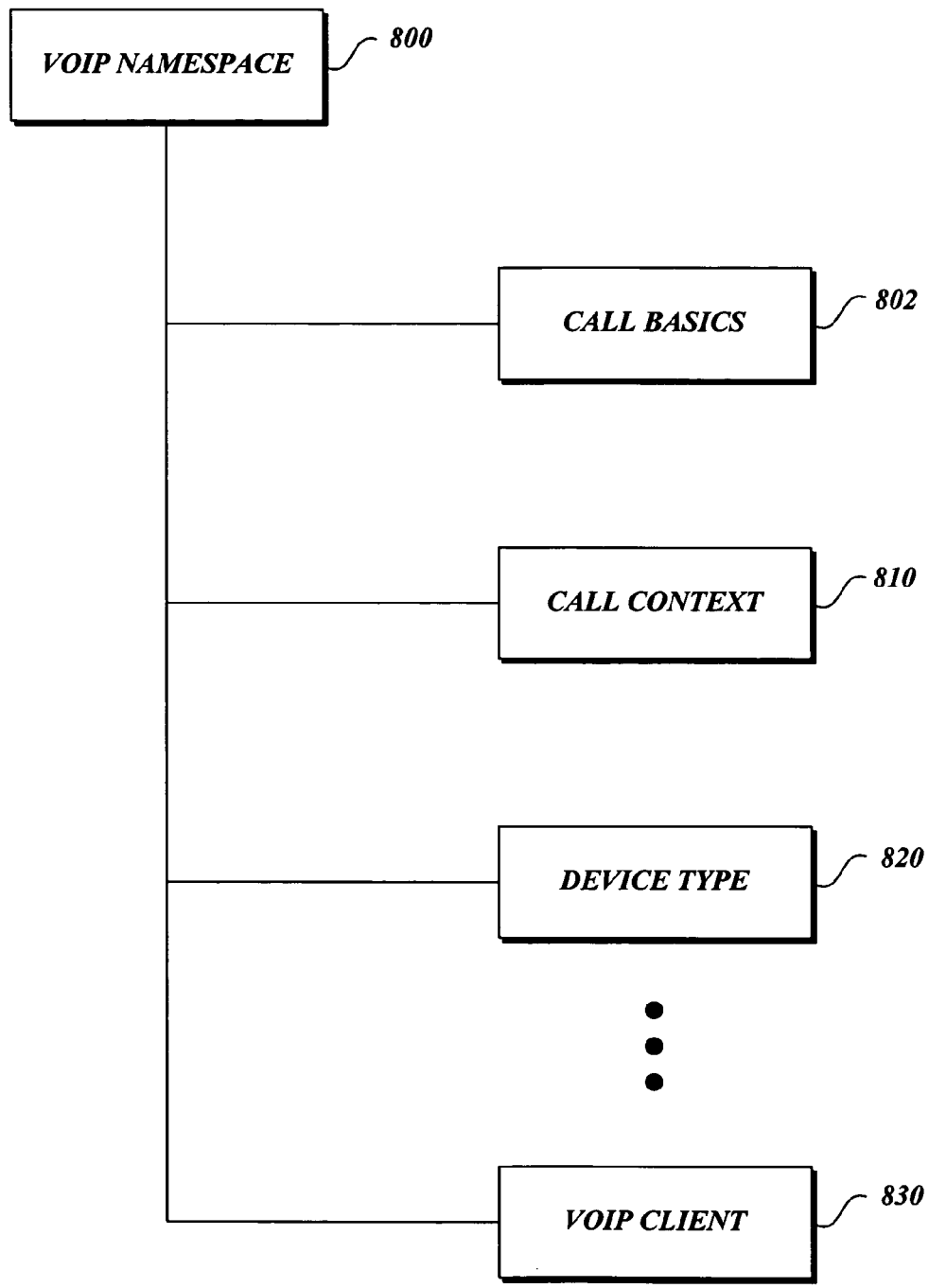
FIGS. 8-12 are block diagrams of various attributes and classes of structured hierarchies corresponding to VoIP contextual information.

The contextual information represented in accordance with the identified structured hierarchies described above may be used to support a proximity service that provides a way to adjust sound characteristics according to the proximity of clients. For example, clients are often symbolically represented by avatars which are interactive representations that are usually graphical and often aural. The proximity of the clients may be represented by the proximity of the clients' avatars. FIG. 7 is a block diagram illustrating the relationship between a group of clients supported by a proximity service and the clients' avatars. In FIG. 7, the symbolic representation 700 of the clients comprises Avatar A 702 and Avatar B 704. Below the symbolic representation 700 is an exemplary network comprising a Provider 756 that communicates with a VoIP client for Avatar A 752 and a VoIP client for Avatar B 754. As the Avatar A 702 moves to a new position the Avatar A 702', the proximity of Avatar A 702 to Avatar B 704 changes. As the proximity changes, the Provider 756 adjusts the contextual information transmitted between the VoIP clients that has to do with one or more sound characteristics. The adjusted contextual information is used by the VoIP clients to adjust how a sound, e.g., a human voice, is produced. For example, as Avatar A 702 moves away from Avatar B 704, a voice message from the VoIP client for Avatar A 752 transmitted to the VoIP client for Avatar B 754 is produced at a lower volume.

As mentioned above, structured hierarchies may be identified for communicating contextual information corresponding to called VoIP client's proximity information. Further, the information regarding the identified structured hierarchies may be transmitted. The information regarding the identified structured hierarchies may include the information about which structured hierarchies carry the contextual information, how to identify the structured hierarchies, and the like. Subsequently, the contextual information corresponding to proximity information may be represented in accordance with the identified structured hierarchies and transmitted.

The structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, a XML namespace is provided to give the namespace a unique name. In some instances, the namespace may be used as a pointer to a centralized location containing default information about the namespace.

A VoIP client 606 may identify a XML namespace for contextual information. For example, the XML namespace attribute may be placed in the start tag of a sending element. It is to be understood that XML namespaces, attributes, and classes illustrated herein are provided merely as an example of structured hierarchies used. After VoIP client 608 receives the XML namespace information, the VoIP client 606 transmits a set of contextual data packets defined in accordance with the identified XML namespace to VoIP client 608. When a namespace is defined in the start tag of an element, all child elements with the same prefix are associated with the same namespace. As such, VoIP client 608 and VoIP client 606 can transmit contextual information without including prefixes in all the child elements, thereby reducing the amount of data packets transmitted for the contextual information.

With reference to FIGS. 8-12, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. The VoIP namespace 800 is represented as a hierarchically structured tree of nodes, each node corresponding to a subclass which corresponds to a subset of VoIP contextual information. For example, a VoIP namespace 800 may be defined as a hierarchically structured tree comprising a call basics class 802, a call contexts class 810, a device type class 820, a VoIP client class 830, and the like.

Figure 9:
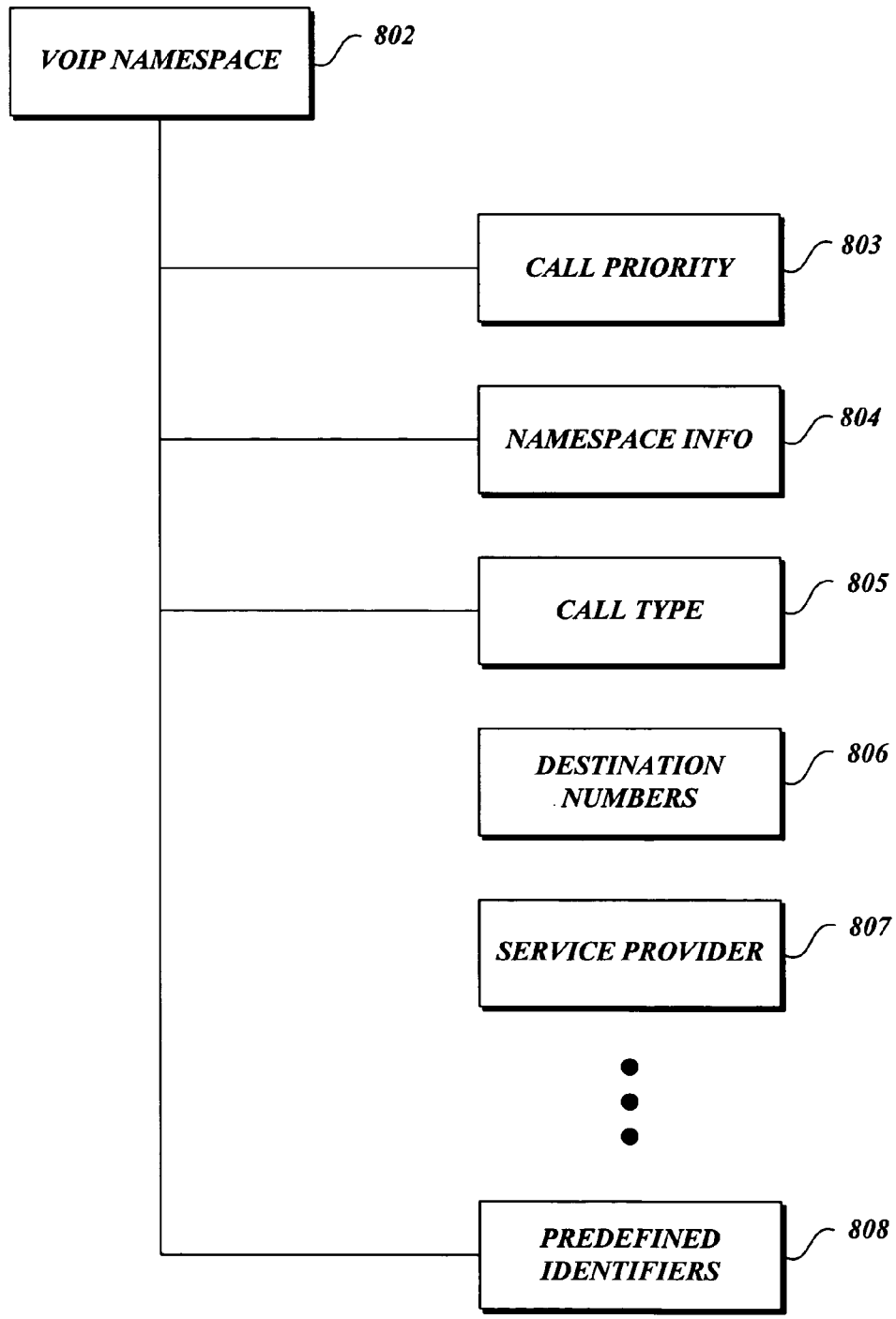

With reference to FIG. 9, a block diagram of a call basics class 802 is shown. For example, call basics class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information such as IP address, MAC address, namespace information and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. The contextual information relating to a conversation channel connection may include predefined identifiers which represent emotions, sounds (e.g., "ah", "oops", "wow", etc.) and facial expressions in graphical symbols. A call basics class 802 may be defined as a sub-tree structure of a VoIP namespace 800, which includes nodes such as call priority 803, namespace information 804, call type 805, destination numbers 806, service provider 807, predefined identifiers 808, and the like.

Figure 10:
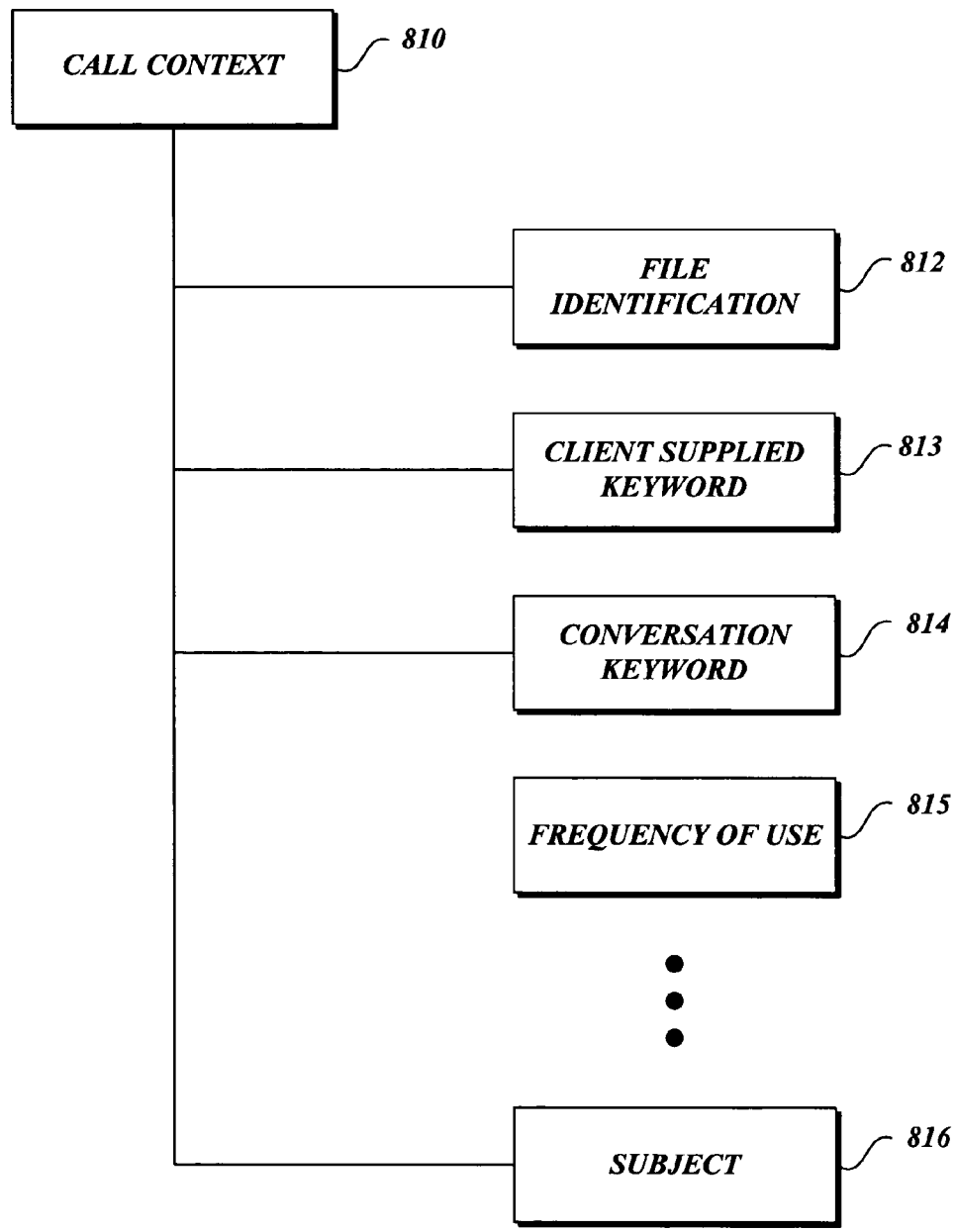

With reference to FIG. 10, a block diagram of a call contexts class 810 is shown. A subset of VoIP contextual information relating to conversation context may correspond to the call contexts class 810. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. For example, a call contexts class 810 may be defined as a sub-tree structure of a VoIP namespace 800, which includes nodes corresponding to file identification 812, client supplied keyword 813, conversation keyword 814, frequency of use 815, subject of the conversation 816, and the like.

Figure 11:
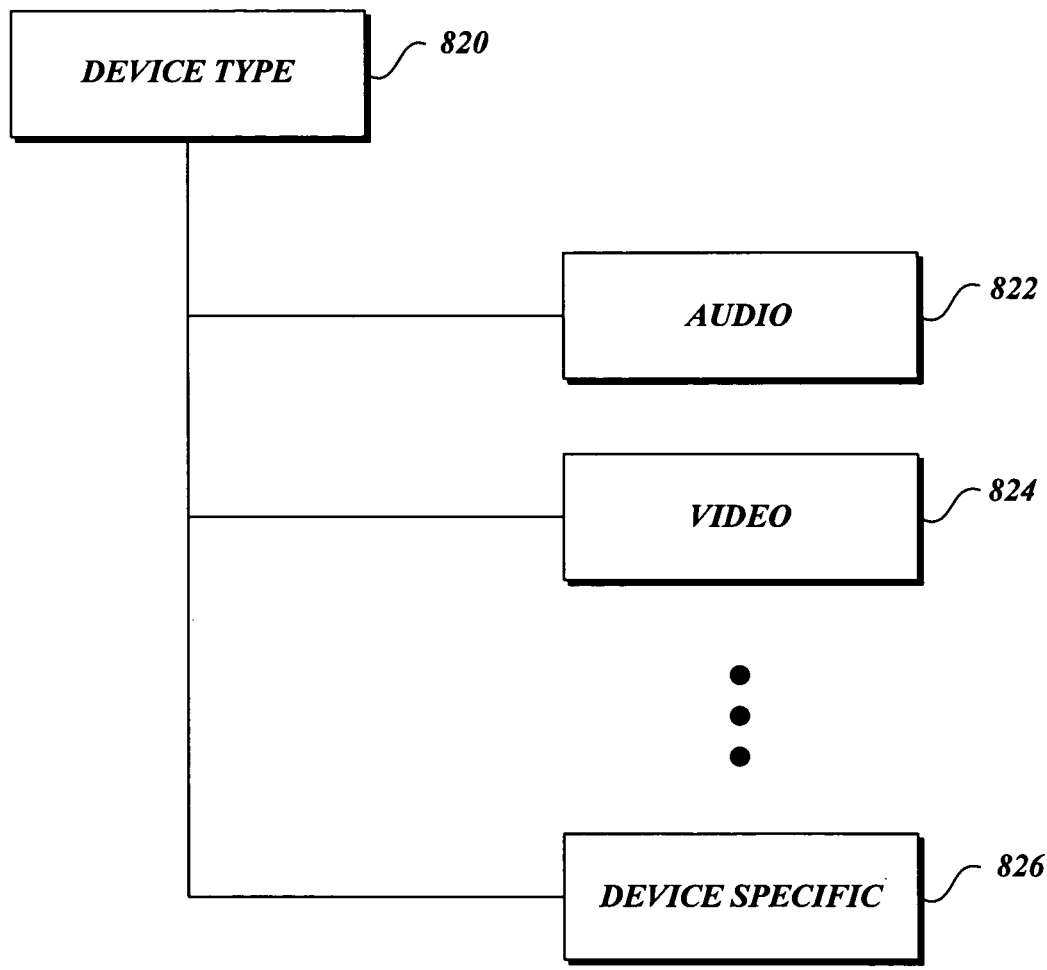

With reference to FIG. 11, a block diagram of a device type class 820 is depicted. A device type class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, digital signal processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. For example, a device type class 820 may be defined as a sub-tree structure of a VoIP namespace 800, which includes nodes corresponding to audio 822, video 824, device specific 826, and the like.

Figure 12:
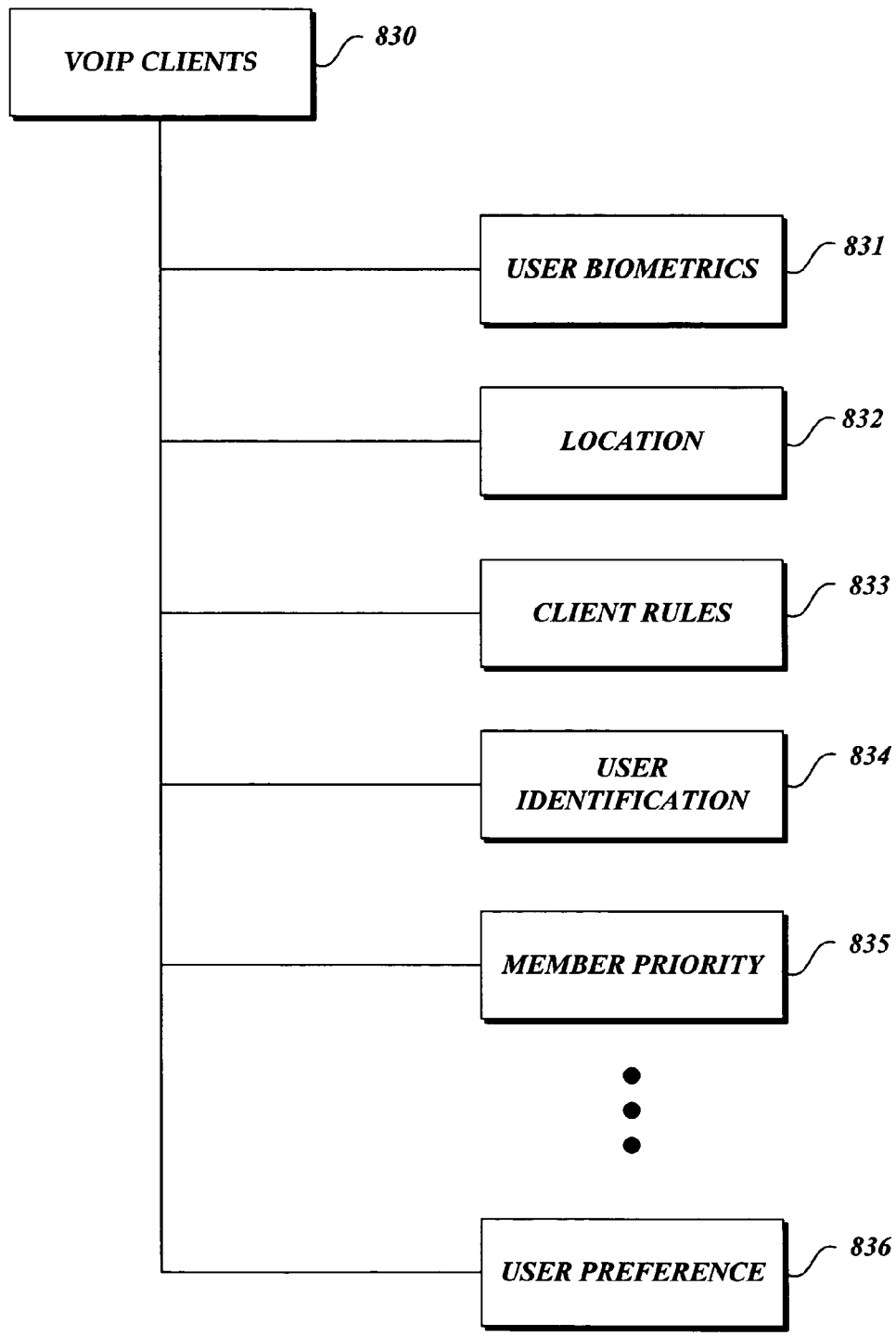

With reference to FIG. 12, a block diagram of a VoIP client class 830 is depicted. For example, a VoIP client class 830 may correspond to a subset of contextual information relating to VoIP clients. The subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. Proximity information, perhaps in the form of an adjustment identifier for adjusting sound in relation to proximity, may also be included in the location information. A VoIP client class 830 may be defined as a sub-tree structure of a VoIP namespace 800, which includes nodes corresponding to user biometrics 831, location 832, client rules 833, user identification 834, member priority 835, user preference 836, and the like.

Figure 13:
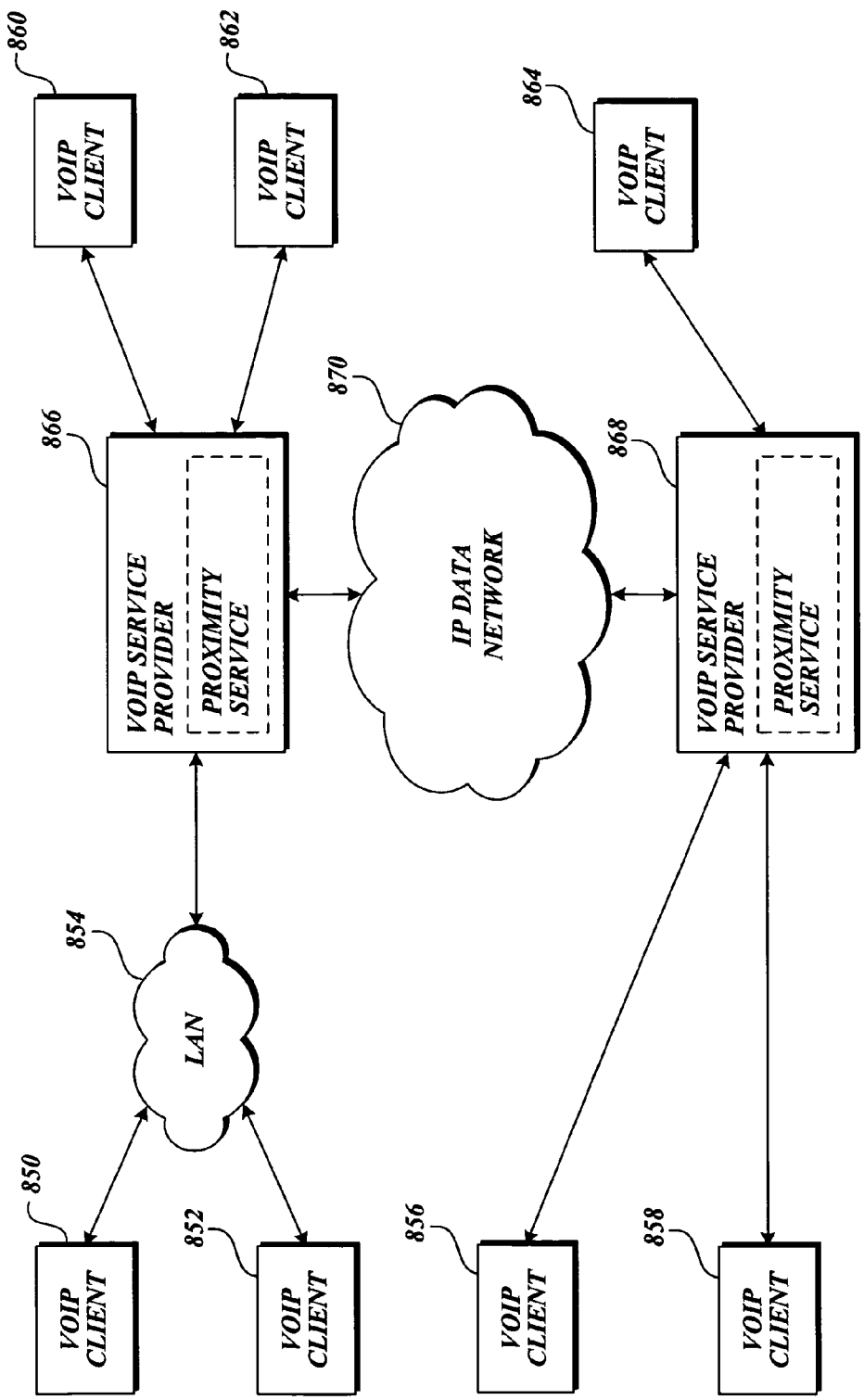
FIG. 13 is a block diagram illustrating an exemplary view of the VoIP system in which an exemplary proximity service may operate.

The methods and systems described above collect contextual information relating to a conversation over a communication channel and provide structured hierarchies used for communicating the collected contextual information. Such systems and methods are able to support proximity services. FIG. 13 is a block diagram illustrating an exemplary system in which a proximity service may operate in accordance with an embodiment of the present invention. The system may include an IP data network 870, one or more VoIP service providers 866, 868, in which a proximity service operates, and a plurality of VoIP clients such as VoIP clients 856, 858, 860, 862, 864 in communication with the VoIP service providers 866, 868. The system may also include additional VoIP clients 850, 852 in communication with VoIP service provider 866, 868 via a LAN 854. VoIP contextual data packets, including proximity data and voice data packets, are transmitted between VoIP clients 850, 852, 856, 858, 860, 862, and 864 by way of the IP data network 870. The VoIP clients 850 and 852 transmit data packets to, and receive data packets from, the LAN 854 that, in turn, transmits the data packets to, or receives the data packets from, VoIP service provider 866. VoIP clients 860 and 862 transmit data packets to, and receive data packets from, VoIP service provider 866. Similarly, VoIP clients 856, 858, and 864 transmit data packets to, and receive data packets from, VoIP service provider 868. A proximity service may operate on one or more servers, such as VoIP service providers 866 and 868. The proximity service may also operate on a VoIP client, such as VoIP client 850, or on a combination of VoIP clients and VoIP service providers. Thus the operation of a proximity service on a VoIP service provider should be construed as exemplary and not limiting.

Figure 14:
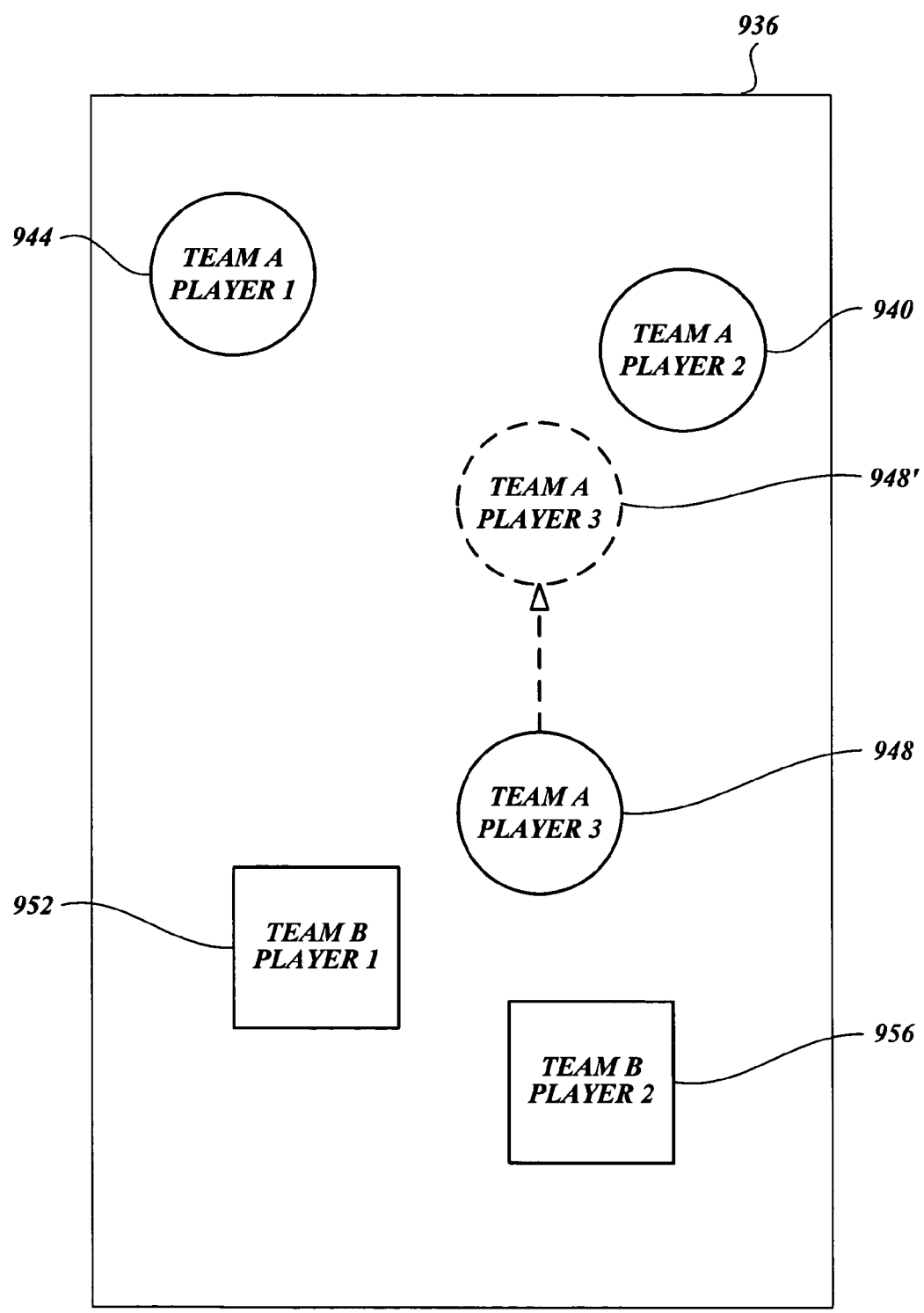
FIG. 14 illustrates an exemplary display in an exemplary computer game in which members of two teams are represented.

The proximity service operating in the system illustrated in FIG. 13 and described above may provide proximity services to a plurality of networked clients. For example, proximity services may be provided for multiplayer online computer games which are often played on a plurality of clients connected by a network. Often participants of multiplayer online computer games are graphically represented by images of players on a virtual playing field. FIG. 14 illustrates a block diagram of an exemplary playing field that may be used in one example of multiplayer online computer game. The playing field 936 contains five images representing five players 940, 944, 948, 952, 956 divided into two teams (Team A and Team B). Team A comprises three players team A player 1 944, team A player 2 940, and team A player 3 948. Team B comprises two players, team B player 1 952 and team B player 2 956. A participant, through interaction with a computing device, controls the player that represents the participant. Input from the participant using the computing device causes that participant's player to move and change position on the playing field 936. Preferably, as the players' positions change relative to one another (i.e., the players' proximity changes), sound characteristics (volume) of other participants that are transmitted and reproduced to the participant change to enhance the experience of players moving toward and away from each other.

For example, as shown in FIG. 14, team A player 3 948 moves from one position to a new position, represented by team A player 3 948'. In the first position that team A player 3

948 occupies, team A player 3 948 is closer to team B than to team A. Preferably, when team A player 3 948 communicates with team A player 2 940, the volume of the voices of the two players will be lower than when team A player 3 948' communicates with team A player 2 940. More specifically, as the virtual proximity of team A player 3 948 and team A player 2 940 changes, the volume changes accordingly. As the proximity of team A player 3 948 and team A player 2 940 decreases, the volumes of the voices of the two players increase. As the proximity of team A player 3 948 and team A player 2 940 increases, the volumes of the voices of the two players decrease. In general, the volume of the voices of the players changes inversely with respect to the proximity of the players. It is also possible to change volume and/or other sound characteristics in other ways. For example, one player may manually set his or her volume to become lower as proximity decreases to sneak up on another player or set his or her volume higher as proximity decreases to scare another player. Hence, an inverse relationship between players' voice volumes and proximity should be construed as exemplary and not limiting.

In the foregoing example, volume varies in a way that is perceived as linear. It is also possible to vary volume in non-linear ways and to vary one or more other sounds or sound characteristics, e.g., frequency, echo, etc., according to proximity. Hence, the linear varying of the voice volume of players according to proximity should be construed as exemplary and not limiting.

Varying sound characteristics according to proximity may be applied in applications other than games. For example, simulations of emergency rescue situations such as rescuing victims from burning buildings or damaged mine shafts may benefit from varying the voice volume of victims according to their proximity to rescuers and/or, based on other factors, present in the simulation, siren noise, etc. Another example in which varying sound characteristics according to proximity may provide benefits are multiparty telephone conferences. In a physical, face-to-face conference participants in close proximity are able to hear each other better than participants located farther away from one another. This effect may be simulated in multiparty telephone conferences by varying sound characteristics according to proximity. Hence, varying sound characteristics according to proximity in games should be construed as exemplary and not limiting.

There are various strategies that can be used to adjust sound characteristics in applications such as those illustrated in FIG. 14 and described above. FIGS. 15-20B illustrate exemplary methods for adjusting sound characteristics according to the proximity of clients, i.e., devices used to send and receive data packets such as the devices used by the team players represented in FIG. 14. The exemplary methods illustrated in FIGS. 15-20B may be provided by a proximity service such as the proximity service supported by VoIP service providers 866, 868. Alternatively, the exemplary methods illustrated in FIGS. 15-20B may be provided by a proximity service supported by VoIP clients such as VoIP clients 850, 852, 856, 858, 860, 862, and 864.

Figure 15:
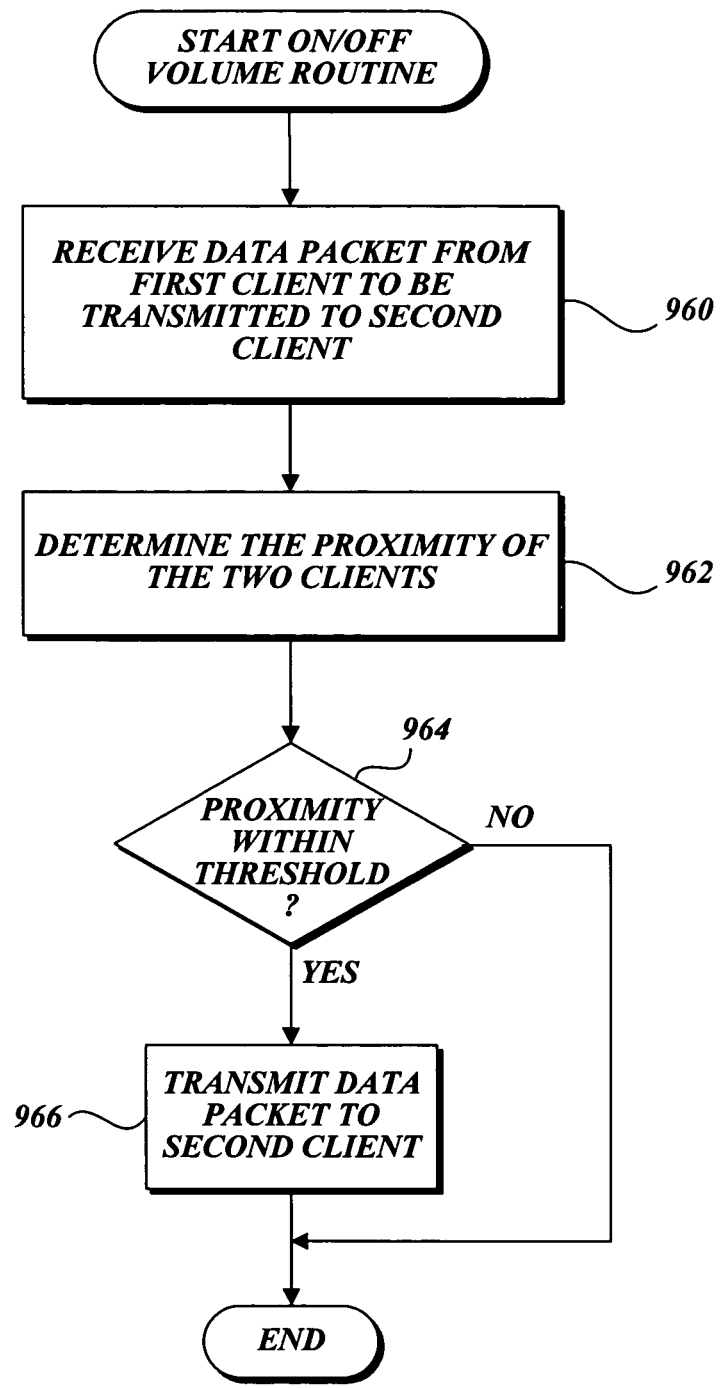
FIG. 15 is a flow diagram illustrating an exemplary method for turning a sound on or off according to the proximity of two clients.

FIG. 15 illustrates an exemplary method for setting a sound's volume to "on" or "off," according to a threshold proximity value. For example, in a game such as the game illustrated in FIG. 14, a first player representing a first participant, may be within 50 "virtual" feet of a second player representing a second participant. The actual participants and/or the VoIP clients of the participants may be physically much closer, or much farther, than 50 feet. The virtual proximity of the players representing the participants is scaled to the playing field 936 of the game. If the first player is within 50 feet of the second player, the sounds from the first player (voice, walking noise, etc.) are set to "on" and the participant represented by the second player is able to hear those sounds. If the first player is 50 feet or more from the second player, the sounds from the first player are set to "off" and the participant represented by the second player is unable to be hear those sounds. Preferably, if the volume of the first player is set to "off," the data packet containing the sound data is not transmitted. If the first player's volume is set to "on," the data packet containing the sound data is transmitted.

The exemplary method shown in FIG. 15 begins at block 960, where a data packet is received from a first client to be transmitted to a second client (i.e., a device used by a second participant). At block 962, the virtual proximity of the two clients is determined. For example, if the sounds relate to a virtual game, virtual proximity of players representing the participants is determined. At decision block 964, it is determined if the virtual proximity is within a predefined threshold to warrant setting the volume to "on" and sending the data packet. If the proximity of the two clients is within the threshold, the control flows to block 966, where the data packet is transmitted to the second client, and the routine completes. If the proximity of the two clients is not within the threshold, the data packet is not transmitted and the routine completes.

While the exemplary method shown in FIG. 15 is described using the relationship of two participants, the method may be applied when more than two participants interact. If there are low number of participants, e.g., 20 participants, a server controlling data packet transmission may have enough resources to support exchanging data packets between the participants. For larger numbers of participants, e.g., 200 participants, the method may be adapted by, for example, dividing the playing field into zones and determining the proximity of one zone to another zone instead of one player to another players. The proximity of players in the same zone is determined as described above using the exemplary method shown in FIG. 15. Other ways to adapt the method may be used to scale the method up for larger numbers of participants. Hence, using zones to scale the method for a large number of participants should be construed as exemplary and not limiting.

Figure 16:
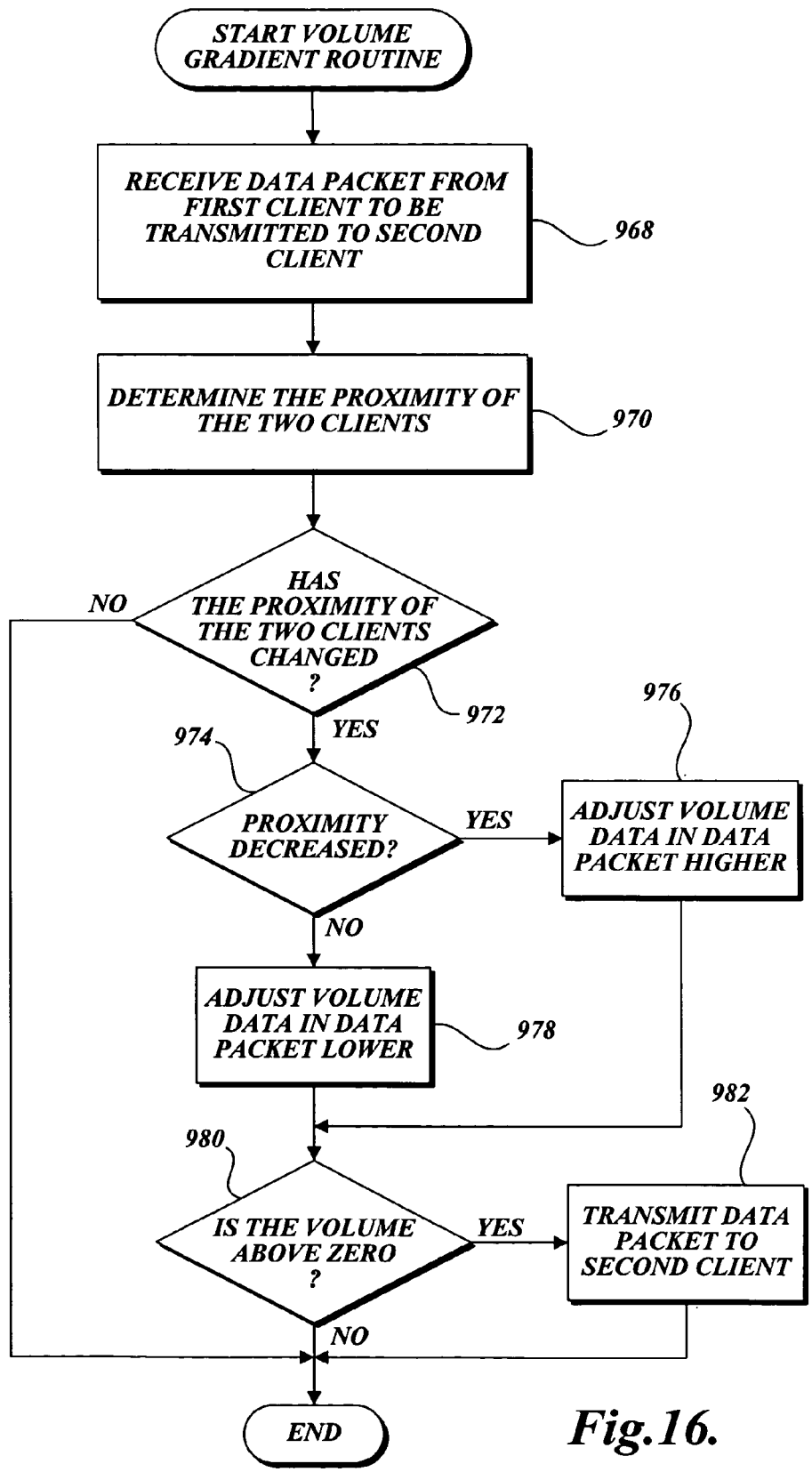
FIG. 16 is a flow diagram illustrating an exemplary method for adjusting volume according to the proximity of two clients.

A more natural perception of sound can be provided by allowing sound volume to vary along a gradient from zero volume to a maximum allowable volume (e.g., 90 decibels). FIG. 16 is a flow diagram that illustrates an exemplary method for adjusting volume along a gradient according to the proximity of clients. The relationships and interactions of clients and players in FIGS. 16-20B are similar to those in the exemplary method illustrated in FIG. 15. The exemplary method illustrated in FIG. 16 starts at block 968, where a proximity service receives a data packet from a first client to be transmitted to a second client. At block 970, the proximity service determines the proximity (virtual or actual) between the two clients. At decision block 972, the proximity service determines if the proximity of the two clients has changed. If the proximity of the two clients has not changed, the process ends. If the proximity of the two clients has changed, control flows to decision block 974 where it is determined if the proximity has decreased. If the proximity has not decreased (i.e., the two clients are further away), the control flows to block 978 where the sound data in the data packet is adjusted such that volume is set to a lower value. If the proximity has decreased, at block 976 the sound data in the data packet is adjusted such that volume is set to a higher value or the original value is maintained. At decision block 980 the proximity service determines if the volume is greater than zero. If the volume is not greater than zero (i.e., the sound is inaudible), the process ends. If the volume is greater than zero, the control flows to block 982, where the data packet is transmitted to the second client and the process ends. Before the data packet is transmitted, the volume may also be checked to insure that it does not exceed a maximum value, e.g., a normal speaking volume. The transmitted data packet received by the second client contains the sound data that is adjusted such that volume is set to a new value or maintained at its original value, if appropriate, based on proximity. The device associated with the second client adjusts the volume to the new value. The participant associated with the client perceives the sound as being louder or softer.

In the exemplary method for adjusting volume along a gradient according to the proximity of clients shown in FIG. 16 and described above, the volume is adjusted by adjusting the volume data in the data packet. It is also possible to insert a volume indicator into a data packet instead of adjusting the volume data itself. A client receiving a data packet adjusts how a sound is reproduced using the original volume data in the data packet and the inserted volume indicator which indicates how to modify the original volume to reproduce a sound a participant hears.

Figure 17:
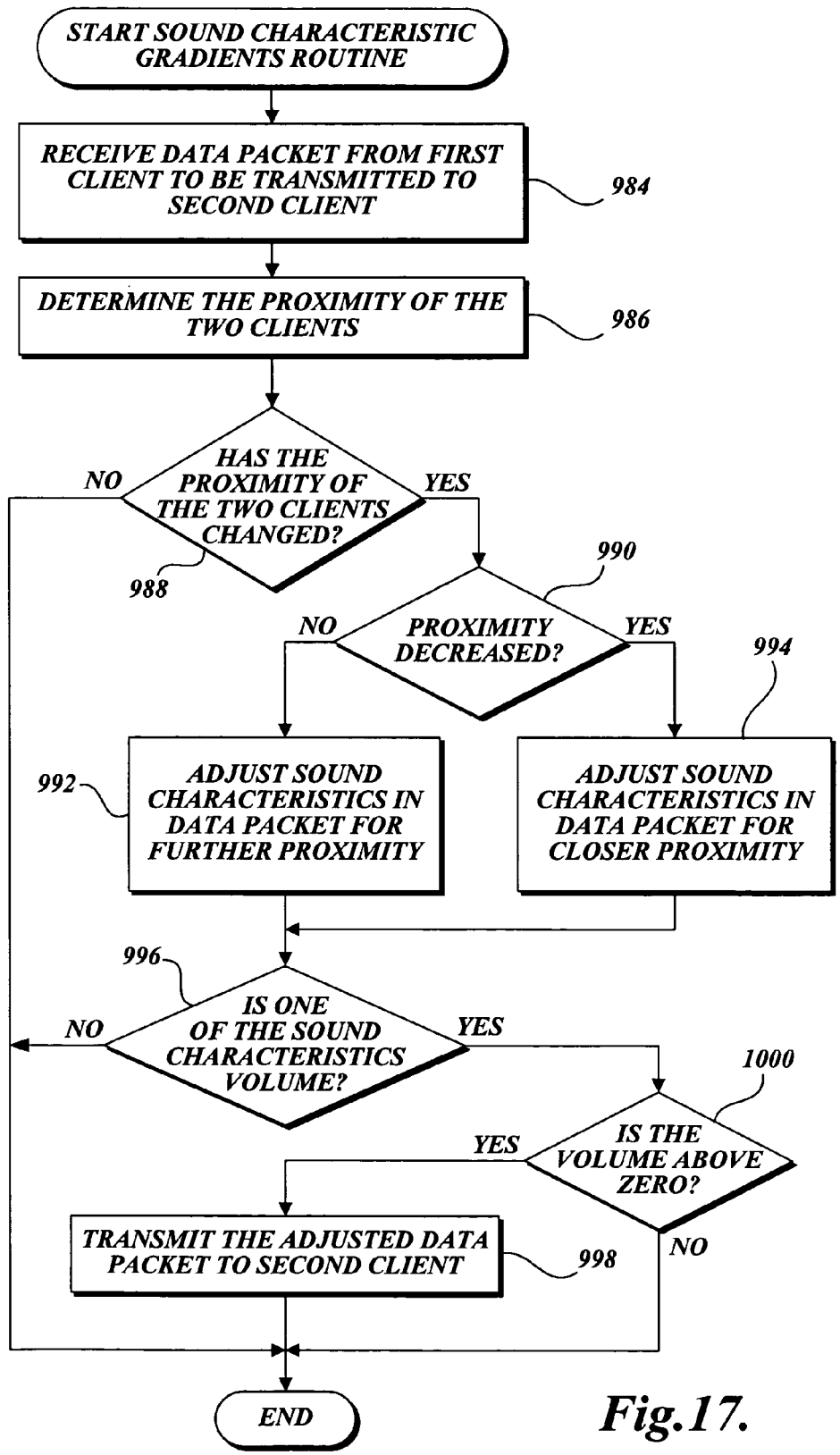
FIG. 17 is a flow diagram illustrating an exemplary method for adjusting a sound characteristic according to the proximity of two clients.

Volume is one sound characteristic that may be adjusted. Other sound characteristics, such as frequency, echo, etc., may also be adjusted. FIG. 17 is a flow diagram that illustrates an exemplary method for adjusting and selecting a sound characteristic and adjusting the selected sound characteristic along a gradient according to the proximity of two clients. The process begins at block 984, where a data packet from a first client, that is to be transmitted to a second client, is received. At block 986, the proximity of the two clients is determined. At decision block 988, it is determined if the proximity between the two clients has changed. If the proximity between the two clients has not changed, the process ends. If the proximity between the two clients has changed, the control flows to decision block 990, where it is determined if the proximity has decreased. If the proximity has not decreased (i.e., the two clients are further away), the sound characteristics in the data packet are adjusted for the further proximity. For example, if a visual game environment depicts atmospheric effects such as fog or falling snow, the effect of these visual cues may be enhanced by having a sound's volume drop off more quickly as the distance between players increases. Sound characteristics such as volume and frequency may be adjusted according to proximity and according to rules dictating how the sound characteristics should be adjusted.

Returning to decision block 990, if it is determined that the proximity has not decreased, at block 992 the sound characteristics in the data packet are adjusted for the farther proximity. If it is determined that the proximity has decreased, at block 994 the sound characteristics in the data packet are adjusted for the closer proximity. For example, if the players representing the participants of the game are in a room with an echo, the volume may be adjusted and the sound characteristics to produce an echo may also be adjusted. If the players are closer, the volume may be increased and the echo reduced. At decision block 996 it is determined if one of the adjusted sound characteristics is volume. If one of the adjusted sound characteristics is not volume, the process completes. If one of the adjusted sound characteristics is volume, at decision block 1000 it is determined whether the volume is greater than zero. If the volume is not greater than zero (i.e., the volume is inaudible), the process completes. However, if the volume is greater than zero, the data packet containing the adjusted data is transmitted to the second client at block 998 and the process completes.

Figure 18A:
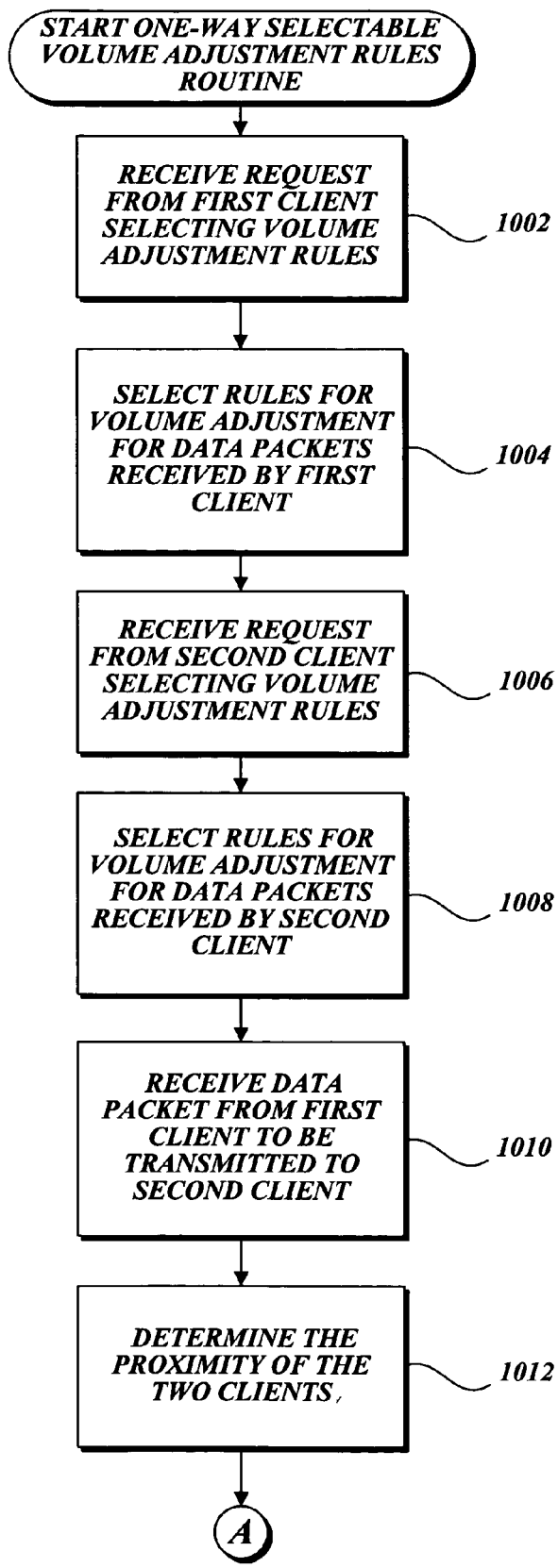
FIGS. 18A-18B are comprised of flow diagrams illustrating an exemplary method for selecting volume adjustment rules in a one-way direction.
Figure 18B:
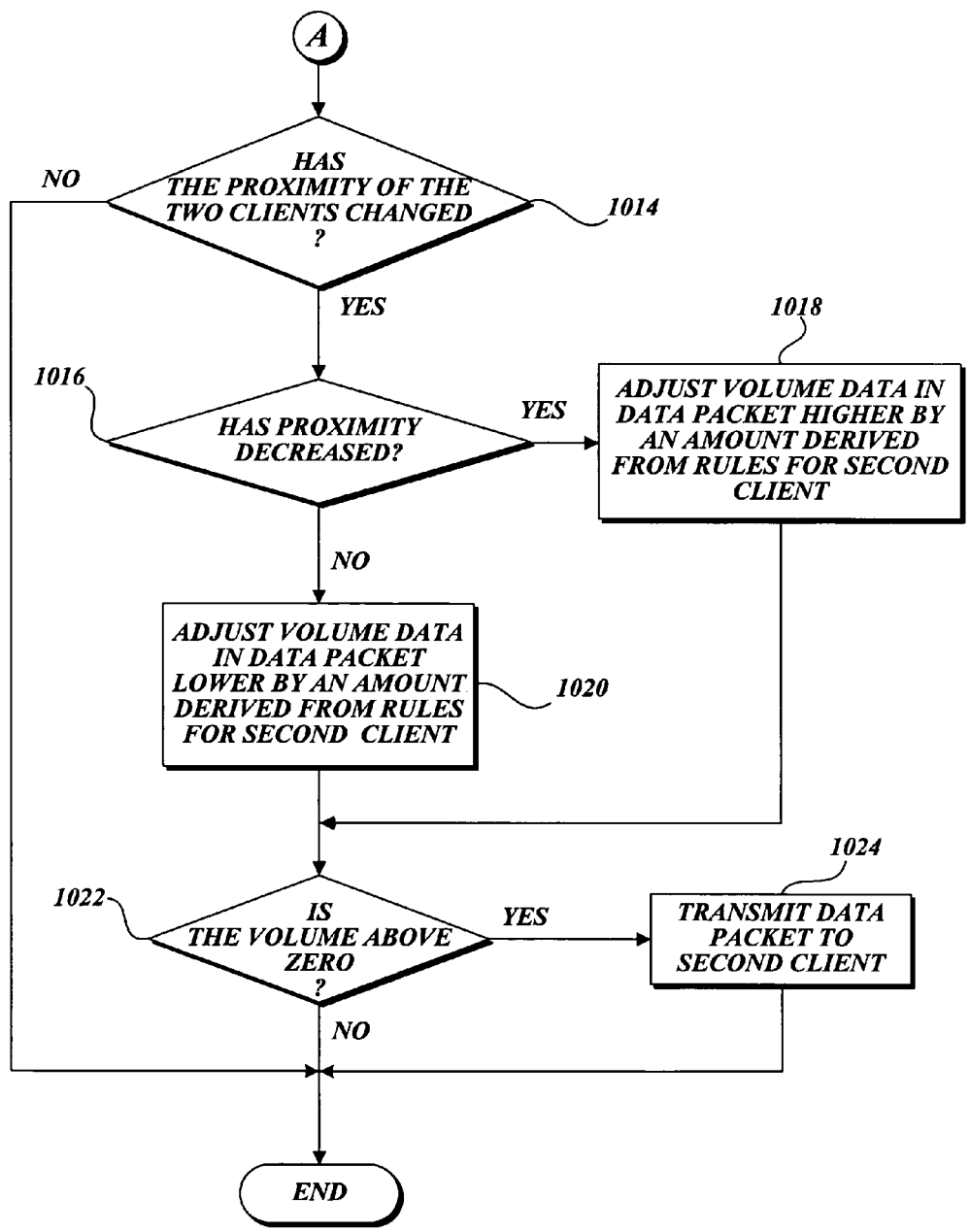

The exemplary methods illustrated in FIGS. 15-17 and described above may use fixed rules to adjust sound characteristics such as volume. It is also possible to employ methods in which the rules for adjusting sound characteristics are selectable. For example, there may be a set of rules indicating how volume should be modified for received data packets. There may be, for example, two rules R1 and R2. R1 may indicate that for data packets received from a certain level of participant in a hierarchy of levels of participants, volume should be adjusted to a minimum level. R2 may indicate that if the volume in a received data packet exceeds some maximum, the volume is set to the maximum. Since the rules R1 and R2 govern only the data packet received by a client, the client is able to select rules in only one direction or one way, thus the rules R1 and R2 are examples of one-way selectable rules. FIGS. 18A-18B comprise a functional flow diagram that illustrates an exemplary method for adjusting the volume of received data packets according to rules that are selectable by each client. The rules govern the volume data in the data packets received by the clients and are thus one-way selectable volume adjustment rules.

The process begins at block 1002, where a request is received from a first client selecting volume adjustment rules. At block 1004, rules are selected for volume adjustment for data packets received by the first client. At block 1006, a request is received from a second client selecting volume adjustment rules. At block 1008, rules are selected for volume adjustment for data packets received by the second client. At block 1010, data packets are received from the first client to be transmitted to the second client. At block 1012, the proximity of the two clients is determined. While the steps in blocks 1002 through 1012 are shown sequentially, it is also possible for one or more steps to be performed concurrently. Control flows to decision block 1014 shown in FIG. 18B.

At decision block 1014, it is determined if the proximity of the two clients has changed. If the proximity of the two clients has not changed, the process ends. If the proximity of the two clients has changed, the control flows to decision block 1016, where it is determined if the proximity has decreased. If the proximity has not decreased, at block 1020 the volume data in the data packet is adjusted lower by an amount derived from the rules governing the data packets received by the second client. For example, the rules for the second client may adjust volume according to aquatic environmental factors for perceiving sound under water. For the second client using aquatic environmental factors rules, a sound's volume may drop off more rapidly than when using the atmospheric environmental factors rules for perceiving sound in air. If it is determined at decision block 1016 that the proximity has decreased, at block 1018 the volume data in the data packet is adjusted higher by an amount derived from the rules for the second client. At decision block 1022 it is determined if the volume is greater than zero. If the volume is not greater than zero (i.e., the volume is inaudible), the process ends. If the volume is greater than zero, the data packet is transmitted to the second client at block 1024, and the process completes.

Figure 19A:
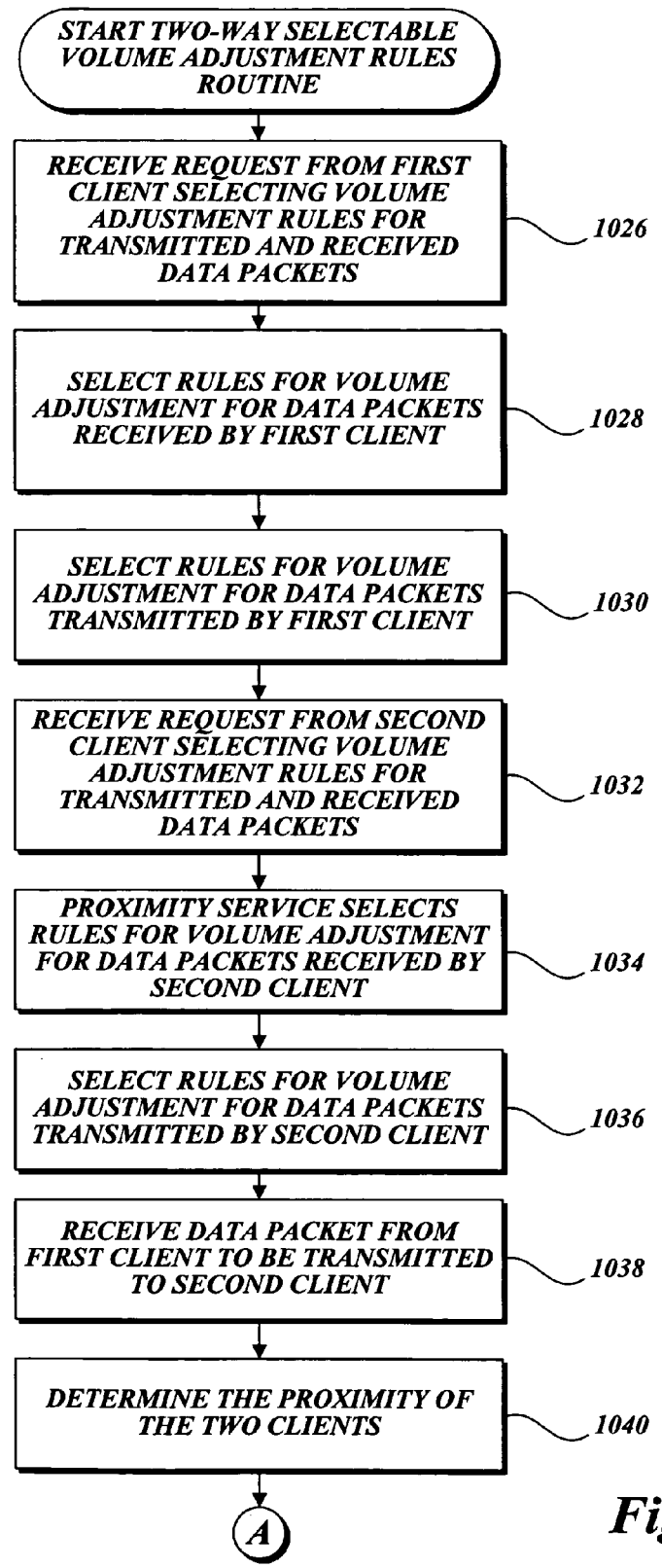
FIGS. 19A-19B comprise a flow diagram that illustrates an exemplary method for two-way selectable volume adjustment rules.
Figure 19B:
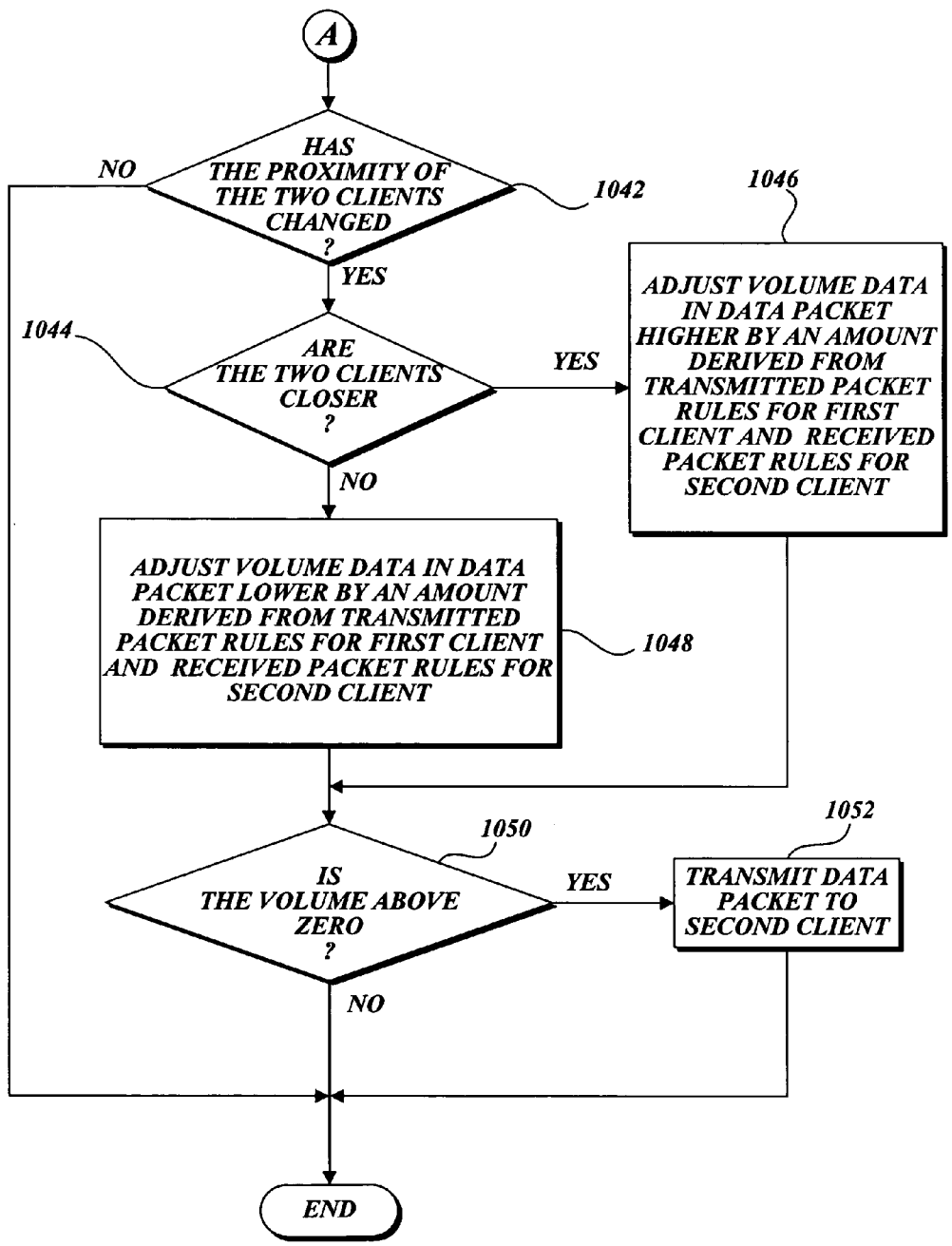

FIGS. 19A-19B comprise a functional flow diagram that illustrates an exemplary method for adjusting the volume of transmitted and received data packets according to rules that are selectable by each client. The rules govern the volume data in the data packets transmitted and received by the clients and are thus two-way selectable volume adjustment rules. The process begins at block 1026, where a request from a first client selecting volume adjustment rules for transmitted and received data packets is received. For example, there may be five rules, rules T1-T5, available that govern how data in transmitted data packets are adjusted and three rules, rules R1-R3, that govern how data in received data packets are adjusted. The request from the first client may include rules R1, T1, and T2. At block 1028, rules are selected for volume adjustment for data packets received by the first client (e.g., rule R1 is selected for the first client). At block 1030, rules are selected for volume adjustment for data packets transmitted by the first client (e.g., rules T1, T2). At block 1032, a request is received from the second client for selecting volume adjustment rules for transmitted and received data packets. For example, the request from the second client may include rules R3, T4, and T5. At block 1034, rules are selected for volume adjustment for data packets received by the second client (e.g., rule R3). At block 1036, rules are selected for volume adjustment for data packets transmitted by the second client (e.g., rules T4 and T5). At block 1038, a data packet is received from the first client to be transmitted to the second client. At block 1040, the proximity of the two clients is determined. While the steps in blocks 1026 through 1040 are shown sequentially, it is also possible for one or more steps to be performed concurrently. The control flows to decision block 1042 in FIG. 19B.

At decision block 1042, it is determined if the proximity of the two clients has changed. If the proximity of the two clients has not changed, the process ends. If the proximity of the two clients has changed, at decision block 1044, it is determined if the proximity has decreased. If the proximity has decreased, at block 1046 the volume data in the data packet is adjusted higher by an amount derived from transmitted packet rules for the first client and the received packet rules for second client. However, if the proximity has not decreased, at block 1048 the volume data in the data packet is adjusted lower by an amount derived from transmitted packet rules for the first client and the received packet rules for second client. Control flows to decision block 1050, where it is determined if the volume is greater than zero. If the volume is not greater than zero (i.e., the volume is inaudible), the process completes. If the volume is greater than zero, the control flows to block 1052 where the data packet is transmitted to the second client. The received and transmitted packet rules may be determined by the clients or may be determined by a third party.

Figure 20A:
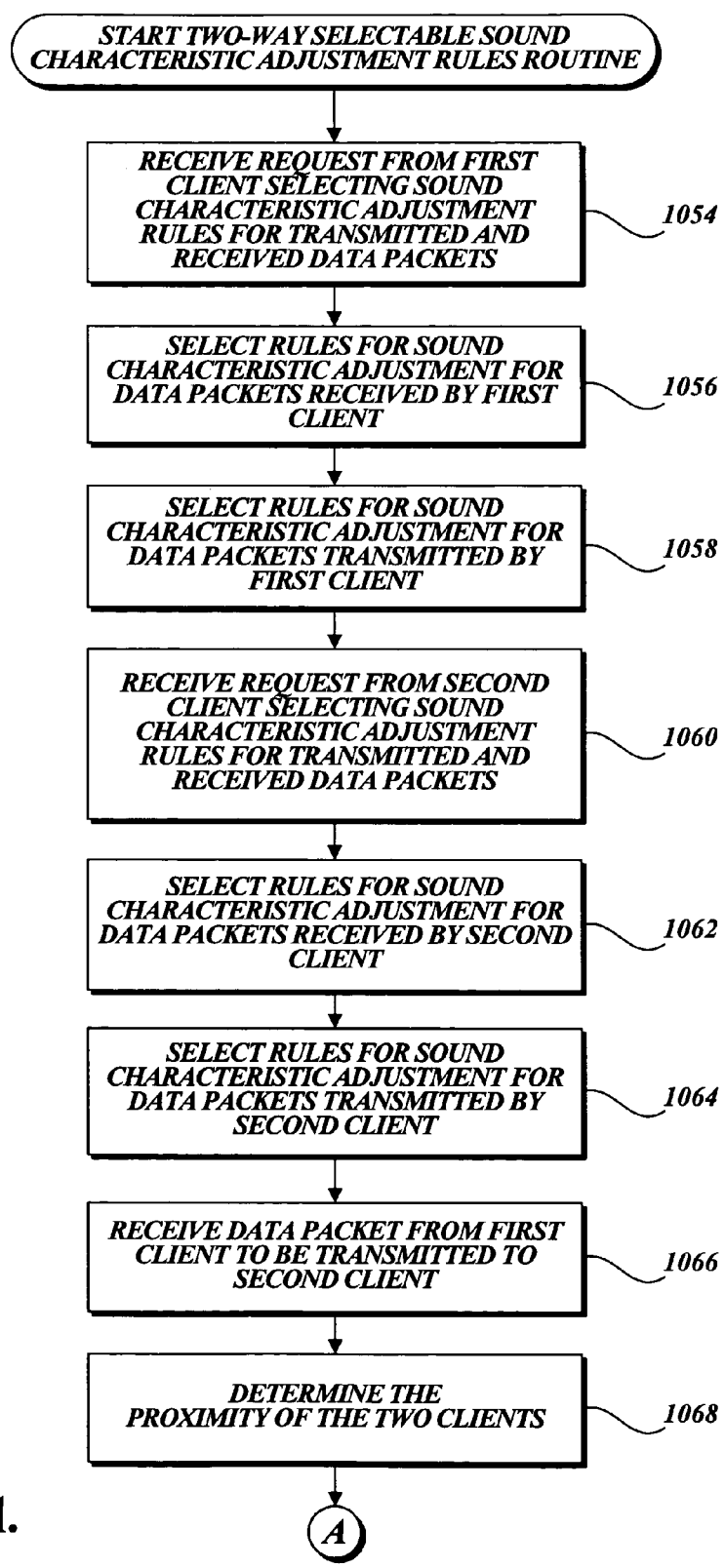
FIGS. 20A-20B comprise a flow diagram that illustrates an exemplary method for two-way selectable sound characteristic adjustment rules.
Figure 20B:
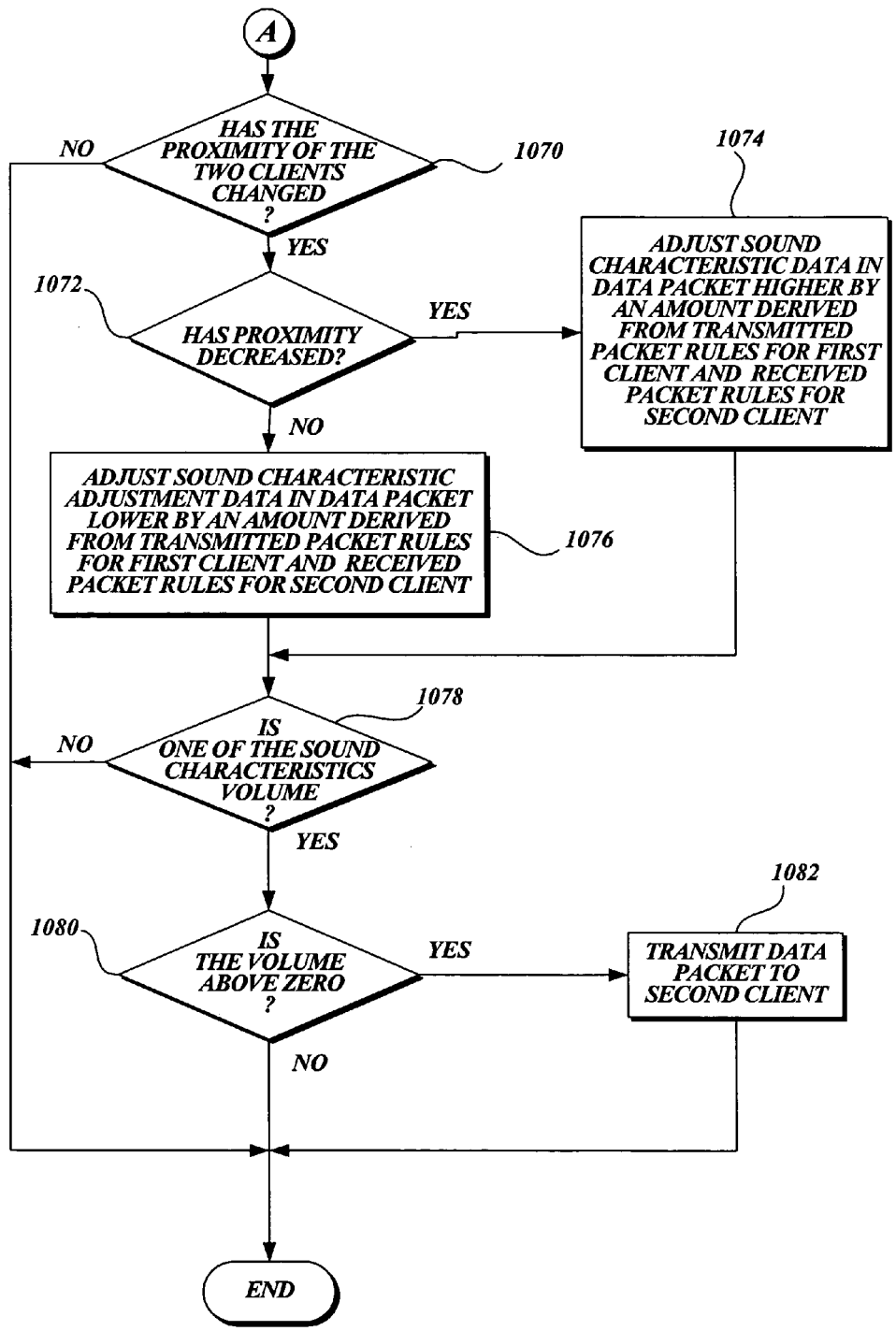

In addition to, or instead of, adjusting volume and selecting the rules for adjusting volume, other sound characteristics, such as frequency, may be adjusted and rules for adjusting the sound characteristics may be selected using a method similar to the exemplary method shown in FIGS. 19A-19B and described above. FIGS. 20A-20B comprise a flow diagram that illustrates an exemplary method for selecting rules for adjusting sound characteristics and for adjusting sound characteristics contained in the data in transmitted and received data packets. The rules govern the sound characteristic data in the data packets that are transmitted and received by the clients and are thus two-way selectable sound characteristic adjustment rules. The method provides the programming flexibility necessary to apply environmental factors (e.g., falling snow) to create unique sound environments for each client in a conversation (e.g., each player in a game).

The process begins at block 1054 shown in FIG. 20A, where a request is received from the first client for selecting sound characteristic adjustment rules for transmitted and received data packets. At block 1056, rules for sound characteristic adjustment for data packets received by the first client are selected. At block 1058, rules for sound characteristic adjustment for data packets transmitted by the first client are selected. At block 1060, a request is received from the second client for selecting sound characteristic adjustment rules for transmitted and received data packets. At block 1062, rules for sound characteristic adjustment for data packets received by the second client are selected. At block 1064, rules for sound characteristic adjustment for data packets transmitted by the second client are selected. At block 1066, a data packet from the first client to be transmitted to the second client is received. At block 1068, the proximity of the two clients is determined. While the steps in blocks 1054 through 1068 are shown sequentially, it is also possible for one or more steps to be performed concurrently.

The control flows to decision block 1070 shown in FIG. 20B. At decision block 1070, it is determined if the proximity between the two clients has changed. If the proximity between the two clients has not changed, the process ends. If the proximity between the two clients has changed, the control flows to block 1072, where it is determined if the proximity has decreased since the last position check. If the proximity has decreased, at block 1074 the sound characteristics in the sound data packet are adjusted higher by an amount derived from the transmitted packet rules for the first client and the received packet rules for the second client. If the proximity has not decreased, at block 1076 the sound characteristics are adjusted lower by an amount derived from the transmitted packet rules for the first client and the received packet rules for the second client. After adjusting the sound at either block 1074, 1076, at decision block 1078 it is determined if one of the adjusted sound characteristics is volume. If volume is not one of the adjusted sound characteristics, the process completes. If one of the adjusted sound characteristics is volume, at decision block 1080 it is determined if the volume is greater than zero. If the volume is not greater than zero, the process completes. However, if the volume is greater than zero, at block 1082 the data packet is transmitted to the second client and the process ends.

In the exemplary methods shown in the figures and described above, it is also possible to set one-way or two-way selectable rules to "clip" the volume such that within a certain range of proximity the volume does not change. For example, the volume of the voices of two players in a game that are within a certain virtual proximity, e.g., eight feet, may not change even if the players' proximity becomes less than eight feet.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for adjusting sound data transmitted between a first client and a second client, the method comprising:

before exchanging data packets between the first client and the second client using a processor for exchanging contextual information including sound characteristic adjustment rules between the first client and the second client for determining an adjustment to be provided based on a proximity between the first client and the second client; wherein either or both of the first client and the second client supplies all or a portion of the sound characteristic adjustment rules, wherein a first sound characteristic adjustment rule governs a volume adjustment of data within a transmission of data packets and a second sound characteristic adjustment rule governs a volume adjustment of data within a receipt of data packets between the first client and the second client; wherein the contextual information is communicated using a structured hierarchy that is defined by Extensible Markup Language (XML);

determining the proximity between the first client and the second client; and performing actions in response to determining that the determined proximity between the first client and the second client has changed from a previous determination of the proximity, the actions, comprising:
  selecting sound characteristics to be adjusted based on the determined proximity;
  adjusting the sound data based on the determined proximity; and
  transmitting the adjusted sound data.

2. The method of claim 1, wherein the first client selects the sound characteristics to be adjusted.

3. The method of claim 1, wherein the first client and the second client select the sound characteristics to be adjusted.

4. The method of claim 1, wherein adjusting the sound data includes providing an adjustment indicator for use in adjusting the sound data.

5. The method of claim 1, wherein the determined proximity is a physical proximity between the first client and the second client.

6. The method of claim 1, wherein the determined proximity is a virtual proximity.

7. The method of claim 6, wherein the virtual proximity is a distance between virtual representations of the first client and the second client.

8. A computer-readable storage medium having computer-executable instructions encoded on a memory for adjusting sound data transmitted between a first client and a second client that when executed cause a computing device to:
  before exchanging data packets between the first client and the second client using a processor for exchanging contextual information including sound characteristic adjustment rules between the first client and the second client for determining an adjustment to be provided based on a proximity between the first client and the second client; wherein either or both of the first client and the second client supplies all or a portion of the sound characteristic adjustment rules, wherein a first sound characteristic adjustment rule governs a volume adjustment of data within a transmission of data packets and a second sound characteristic adjustment rule governs a volume adjustment of data within a receipt of data packets between the first client and the second client; wherein the contextual information is communicated using a structured hierarchy that is defined by Extensible Markup Language (XML);
  determining the proximity between the first client and the second client; and
  performing actions in response to determining that the determined proximity between the first client and the second client has changed from a previous determination of the proximity, the actions, comprising:
    selecting sound characteristics to be adjusted based on the determined proximity;
    adjusting the sound data based on the determined proximity; and transmitting the adjusted sound data.

9. The computer-readable storage medium of claim 8, wherein the first client selects the sound characteristic adjustment rules.

10. The computer-readable storage medium of claim 8, wherein the first client and the second client select the sound characteristic adjustment rules.

11. The computer-readable storage medium of claim 8, wherein adjusting the sound data includes providing an adjustment indicator for use in adjusting the sound data.

12. The computer-readable storage medium of claim 8, wherein the sound characteristic adjustment rules comprise rules to adjust volume and frequency based on environmental factors.

13. The computer-readable storage medium of claim 12, wherein the environmental factors are atmospheric environmental factors.

14. The computer-readable storage medium of claim 12, wherein the environmental factors are aquatic environmental factors.

15. A system for adjusting sound data transmitted between a first client and a second client, the system comprising:
  a processor executing instructions stored on a memory; the instructions cause the processor to perform:
  before exchanging data packets between the first client and the second client exchanging contextual information including sound characteristic adjustment rules between the first client and the second client for determining an adjustment to be provided based on a proximity between the first client and the second client; wherein either or both of the first client and the second client supplies all or a portion of the sound characteristic adjustment rules, wherein a first sound characteristic adjustment rule governs a volume adjustment of data within a transmission of data packets and a second sound characteristic adjustment rule governs a volume adjustment of data within a receipt of data packets between the first client and the second client; wherein the contextual information is communicated using a structured hierarchy that is defined by Extensible Markup Language (XML);
  determining the proximity between the first client and the second client; and
  performing actions in response to determining that the determined proximity between the first client and the second client has changed from a previous determination of the proximity, the actions, comprising:
    selecting sound characteristics to be adjusted based on the determined proximity;
    adjusting the sound data based on the determined proximity; and transmitting the adjusted sound data.

16. The system of claim 15, wherein the system is implemented by a service provider.

17. The system of claim 16, wherein the system is implemented on the first client and the second client.

18. The system of claim 16, wherein the system is implemented on a server and on the first client and the second client.

* * * * *